United States Patent [19]
Kimura et al.

[11] Patent Number: 5,694,173
[45] Date of Patent: Dec. 2, 1997

[54] VIDEO DATA ARRANGING METHOD AND VIDEO DATA ENCODING/DECODING APPARATUS

[75] Inventors: Junko Kimura; Kenji Shimoda, both of Kanagawa-ken, Japan

[73] Assignee: Kabushiki Kaisha Toshiba, Kawasaki, Japan

[21] Appl. No.: 366,542

[22] Filed: Dec. 29, 1994

[30] Foreign Application Priority Data

Dec. 29, 1993 [JP] Japan ................................ 5-353987
Jun. 30, 1994 [JP] Japan ................................ 6-149585

[51] Int. Cl.$^6$ ................................................ H04N 7/18
[52] U.S. Cl. .................. 348/423; 348/411; 348/409; 348/405; 348/404
[58] Field of Search .......................... 358/335; 348/423, 348/440, 426, 427, 411, 409, 384, 405, 404

[56] References Cited

U.S. PATENT DOCUMENTS

| | | | |
|---|---|---|---|
| 5,195,135 | 3/1993 | Palmer | 380/20 |
| 5,359,428 | 10/1994 | Kubota et al. | 358/335 |
| 5,377,051 | 12/1994 | Lane et al. | 348/423 |
| 5,434,678 | 7/1995 | Abecassis | 358/335 |
| 5,510,899 | 4/1996 | Kim | 358/335 |
| 5,534,931 | 7/1996 | Kondo et al. | 348/423 |

OTHER PUBLICATIONS

Boyce et al., "Fast Scan Technology for Digital Video Tape Recorders", IEEE Transactions on Consumer Electronics, vol. 39, No. 3, Aug. 1993, New York, pp. 186–191.

Anonymous, "Preventing Undesired Information Reproduction From a Writable Record Carrier", Research Disclosre, No. 335, Mar. 1992, Havant GB, p. 193.

"The MPEG Video Compression Algorithm", Image Communication, vol. 4, No. 2, Apr. 1992, pp. 129–140.

"Housou Gijutsu" (or Broadcasting Technique), vol. 45, No. 5, May 1992, pp. 70–75 (No translation readily available.).

Draft International Standard, Generic Coding of Moving Pictures and Associated Audio, Recommendation H.262 ISO/IEC 13818-2, Chap. 6, "video bistream syntax and semantics", ISO/IEC, 1994.

*Primary Examiner*—Tommy P. Chin
*Assistant Examiner*—Anand S. Rao
*Attorney, Agent, or Firm*—Cushman, Darby & Cushman IP Group of Pillsbury Madison & Sutro LLP

[57] ABSTRACT

A video data arranging method includes the steps of providing a normal bit stream region in which normal playback block codes for normal playback of prescribed picture blocks and special playback block codes for special playback of prescribed picture blocks can be arranged, and providing a extension bit stream region for arranging block codes which are not arranged in the normal bit stream region out of the normal playback block codes and the special playback block codes when there are the normal playback block codes and the special playback block codes for prescribed picture blocks, and video data encoding/decoding apparatus suited for the method.

15 Claims, 24 Drawing Sheets

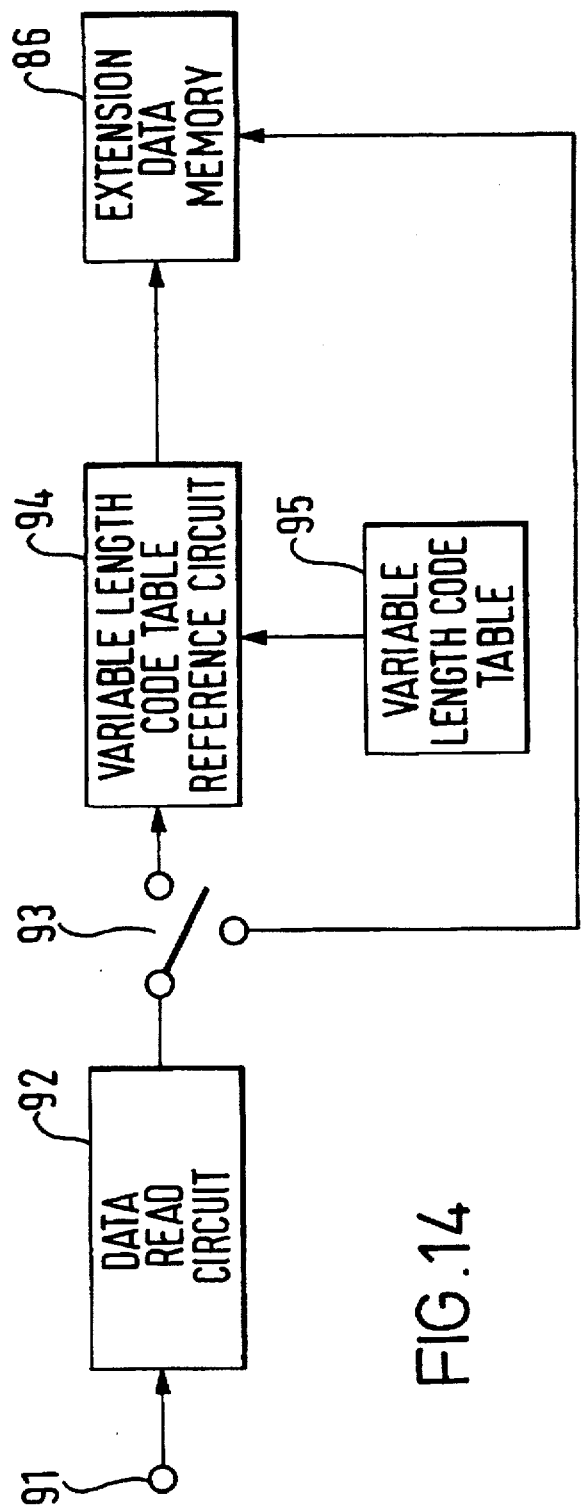
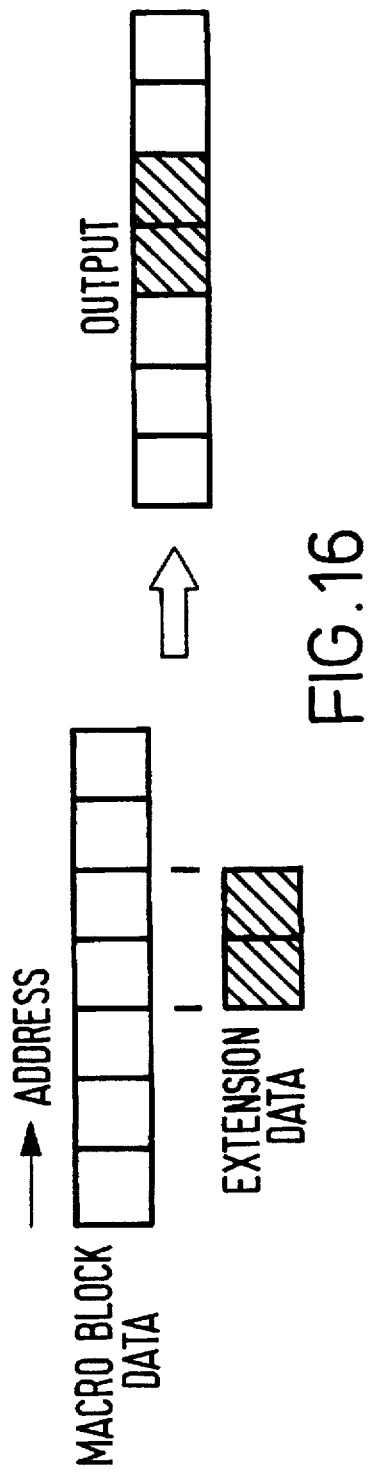

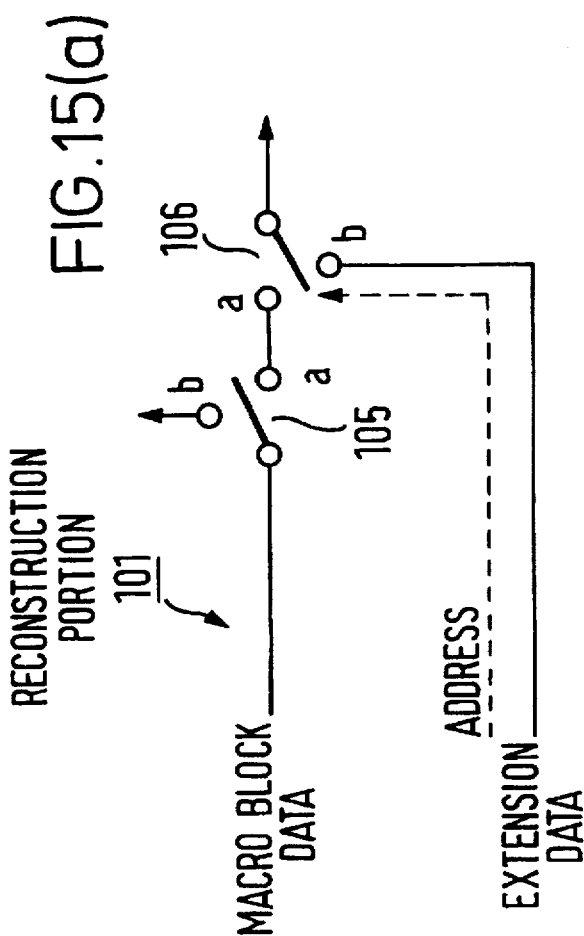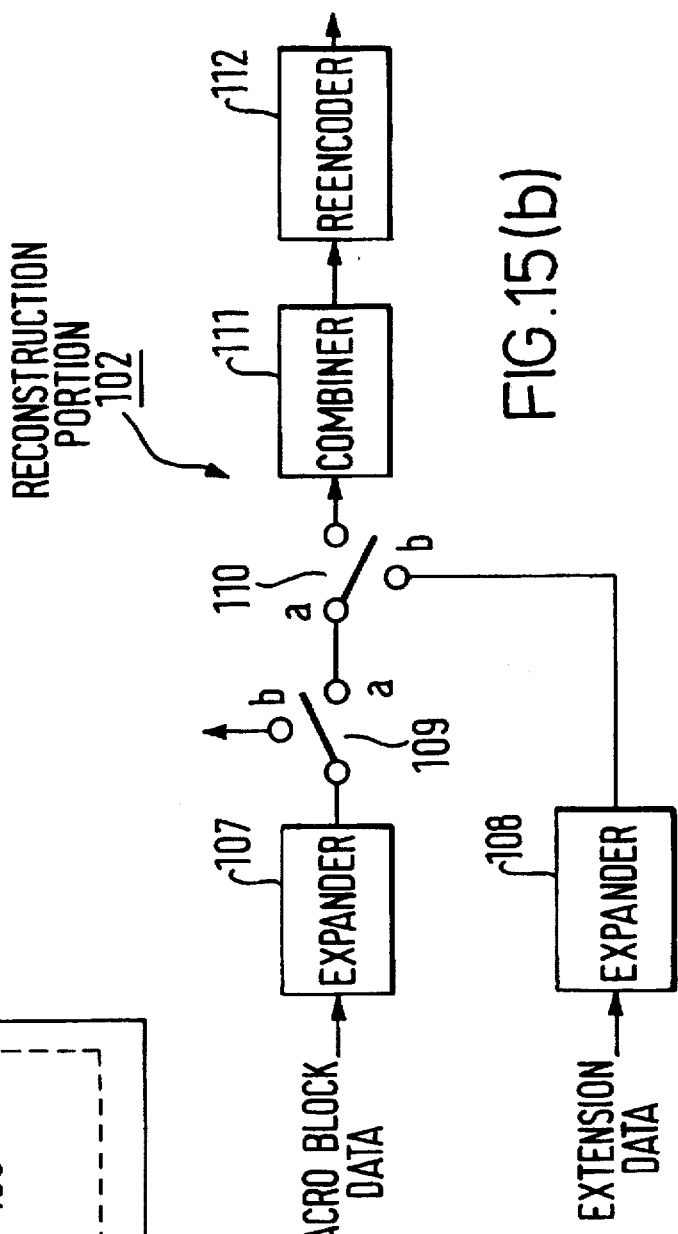

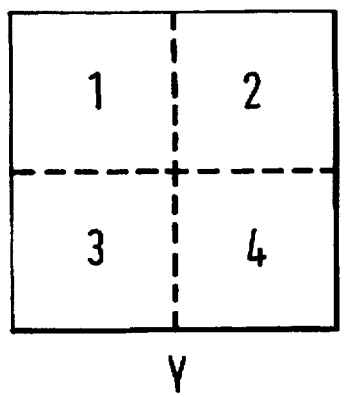
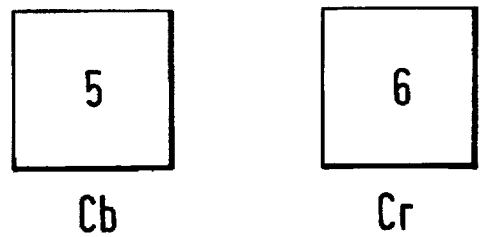
FIG. 20
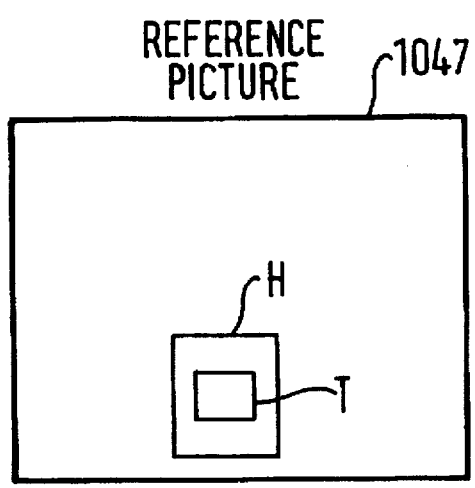
H: REFERENCE PICTURE
EXCLUSION RANGE
T: BLOCK   FIG. 22(a)
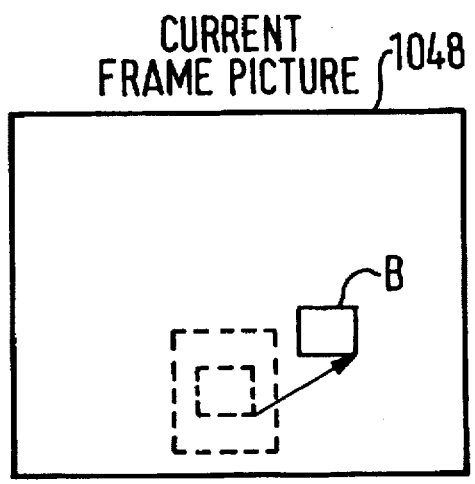
B: BLOCK   FIG. 22(b)
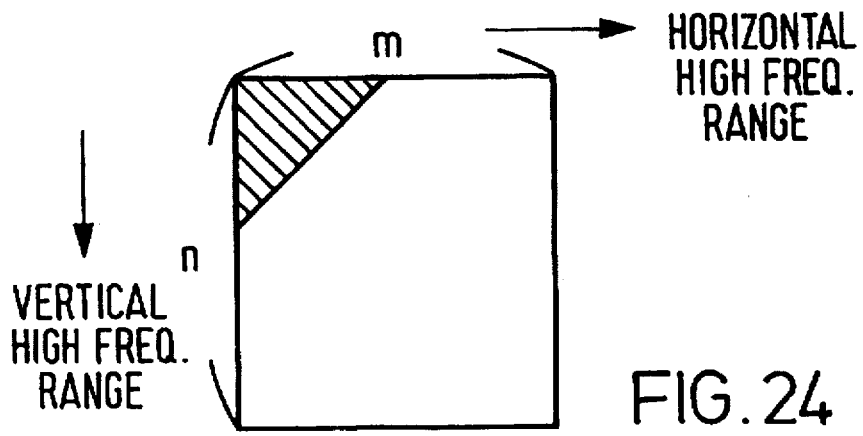
FIG. 24

VIDEO DATA ARRANGING METHOD AND VIDEO DATA ENCODING/DECODING APPARATUS

FIELD OF THE INVENTION

The present invention relates to a video data arranging method and video data encoding/decoding apparatus suited for encoding and decoding video program software required a special playback display operation.

BACKGROUND OF THE INVENTION

Digital compression of picture data has been researched, and in particular, various proposals have been made in recent years for the standardization of high efficiency encoding using a DCT (Digital Cosine Transformation) operation. The DCT operation is to reduce redundancy in the spatial axis by dividing one frame into plural blocks (m pixels×n horizontal scanning lines) and transforming the picture signal into units of this block. By the way, the ITU-T (International Telecommunications Union, Telecommunication Standardization Sector), previously called the CCITT (International Telegraph and Telephone Consultative Committee), has proposed the MPEG (Moving Picture Expert Group) system as a high efficiency encoding system of TV signals for moving pictures. In this system, not only the intra-frame compression by the DCT process is executed, but also the inter-frame compression is adopted to reduce a redundancy in the time base direction using the inter-frame correlation. The inter-frame compression is to reduce the bit rate by obtaining a difference between the forward and backward frames and encoding a difference value using the fact that general moving pictures of the forward and backward frames resemble each other. In particular, the motion compensation inter-frame prediction encoding to reduce a prediction error by obtaining an inter-frame difference and by predicting the motion of a picture is effective.

This motion compensating inter-frame prediction encoding is described in detail in, for instance, "Tendency of Television Digital Encoding Technique" (Broadcasting Technique (1992-May, page-70)), etc. That is, in this encoding, a motion vector is obtained between the picture data D(n) of the current frame and the picture data D(n−1) of a preceding frame. The motion compensated reference picture data D'(n−1) of the preceding frame is obtained by compensating the picture data obtained by decoding the encoded data of the preceding frame. A difference between this reference picture data D'(n−1) and the current frame picture data D(n) is obtained and this difference value (an error component by the motion prediction) is encoded and output.

FIG. 1 is an explanatory diagram showing a hierarchical structure of video data in the MPEG (Moving Picture Experts Group) system.

As illustrated in FIG. 1, the data structure of the MPEG system is hierarchical. The lowest block layer is constructed with horizontal 8 pixels×vertical 8 pixels. The size of one pixel (one block) differs between the luminance component and the color difference component as their sampling periods are different from each other. If a sampling ratio of the luminance component and the color difference component is 4:1, four luminance blocks correspond to one color difference block. For this reason, the macro block layer is constructed with two types of blocks, total four blocks Y0 through Y3 and two blocks of color difference signal Cr and Cb in the horizontal and vertical directions of the luminance component.

A slice layer composed of one or more macro blocks is formed by prediction encoding in units of this macro block, and one frame picture layer is formed by N pieces of the slice layer. Bi-directional prediction, rearward prediction, forward prediction or intra-picture prediction is adopted for the prediction encoding of the macro block. And the GOP layer is constructed with several frames of picture layers. The GOP layer is constructed with bi-directional prediction frame (B picture), forward prediction frame (P picture) and intra-frame prediction frame (I picture).

FIG. 2 is an explanatory diagram for explaining the inter-picture prediction in the GOP layer. The arrow in FIG. 2 shows the direction of the inter-picture prediction. For instance, the seventh frame shows the prediction encoded P picture using the P picture of the fourth frame. The space between I (or P) picture and P (or I) picture is defined by a value of M.

In the MPEG system, for instance, if a prescribed frame is an I picture, all macro blocks are encoded in the slice layer using the intra-frame prediction. Further, in the case of a P picture frame, the macro blocks are encoded in the slice layer using the forward prediction or the intra-frame prediction. In the case of a B picture, the macro blocks are encoded using the intra-frame, forward, rearward prediction or all predictions.

A video sequence layer is formed by a plurality of GOPs. Each of the layers has a header information required for playback, and actual data of video signals are contained in the macro block layer and the block layer. In addition, in prescribed locations of the video sequence layer, the GOP layer, the picture layer and the slice layer, an extension data region for encoding option, etc. and a user data region for storing a user's free information have been defined.

FIG. 3 is a block diagram showing the encoding apparatus for the macro block layer and the block layer containing actual video signal data.

The input macro block data is applied to a block split circuit 2 or a subtractor 3 through a switch 1. Now, in the case of the intra-picture encoding mode for generating the I picture, the switch 1 selects the terminal a by a motion compensating ON/OFF signal. The block split circuit 2 splits the macro block data into the blocks Y0 through Y3, Cr and Cb of the horizontal 8 pixels×vertical 8 pixels and applies them to the DCT circuit 4.

The DCT circuit 4 receiver signals in units of blocks constructed with 8 pixels×8 pixels and transforms the input signals into frequency components through the 8×8 two-dimensional DCT process. Thus, it becomes possible to reduce spatial correlation components. That is, the output (a transformation coefficient) is applied to a quantizer 5. The quantizer 5 reduces the redundancy of one block signal by requantizing the DCT output (the transformation coefficient) in a prescribed quantization range. Further, the quantization range of the quantizer 5 is decided by the quantization range decision circuit 7 based on the amount of generated codes and the amount of allocated set codes, etc.

The quantized data from the quantizer 5 are applied to a coefficient VLC (variable length encoding circuit) 6. The coefficient VLC 6 encodes the quantized output in variable length based on a prescribed variable length code table, for instance, the Huffman code table, etc. and outputs the encoded coefficient output. As a result, a short time sequence of bits is assigned to data having a high appearance probability and a long time sequence of bits is assigned to data having a low appearance probability and thus, transmission quantity is further reduced.

On the other hand, when generating P and B pictures, if it is assumed that a prescribed macro block is prediction encoded, the switch 1 selects the terminal b. The macro block data is applied to the subtractor 3. The subtractor 3 outputs a difference for each pixel data between the current macro block and the motion compensated reference frame macro block (hereinafter referred to as the reference macro block) to the DCT circuit 4 as a prediction error. In this case, the DCT circuit 4 encodes the differential data.

The reference macro block is obtained by decoding the quantized output. That is, the output of the quantizer 5 is also applied to the inverse quantizer 8. The quantized output is inversely quantized by the inverse quantizer 8 and is further inverse DCT processed and restored to the original video signals. In this case, as the output of the subtractor 3 is differential information, the output of the inverse DCT circuit 9 is also differential information. The output of the inverse DCT circuit 9 is applied to an adder 10. The output of the adder 10 is fed back to the adder 10 through an M frame picture memory 11, a reference macro block cut-out circuit 12 and a switch 13. The adder 10 regenerates the current frame macro block data (local decode data) by adding differential data to the reference macro block data from the reference macro block cut-out circuit 12 and outputting them to the M frame picture memory 11.

The M frame picture memory 11 outputs the local decoded data from the adder 10 to the reference macro block cut-out circuit 12 by delaying, for instance, a period of M frames. The reference macro block cut-out circuit 12 is also applied with a motion vector, and the circuit 12 compensates the blocking location of the local decoded data from M frames before by the motion vector and outputs it to the subtractor 3 as the motion compensated reference macro block. Thus, the motion compensated data from M frames before are applied to the subtractor 3 as the reference macro block, and the DCT process is executed on the prediction error from the subtractor 3.

Further, the processes by the block split circuit 2, the DCT circuit 4, the quantizer 5, the coefficient VLC 6, the inverse-quantizer 8, the inverse DCT circuit 9 and the adder 10 are executed repeatedly by the number of blocks contained in the macro block.

Further, it is necessary to transmit a motion vector to blocks requiring the motion compensation. The motion vector is applied to a motion vector VLC 14. The motion vector VLC 14 encodes the motion vector data according to the prescribed variable length code table and outputs the encoded motion vector. Further, it is also necessary to transmit address information of a macro block, of which the transformation coefficient or the motion vector has been encoded. For a macro block containing the encoded transformation coefficient and the motion vector, an address VLC 15 encodes a difference between the macro block's address and an address of the block immediately before an encoded macro block according to the prescribed variable length code table based on the outputs of the coefficient VLC 6 and the motion vector VLC 14 and outputs the encoded address.

By the way, in the case where the coefficients in a prescribed block are all "0", the encoding is not executed. An encoded block pattern VLC 16 encodes pattern data indicating a block containing coefficients other than 0 using the prescribed variable length code table based on the output of the coefficient VLC 6 and outputs an encoded pattern output. Further, it is also necessary to transmit the quantization range data that was used by the quantizer 5 for decoding. A quantization range VLC 17 encodes the quantization range data decided by the quantization range decision circuit 7 according to the prescribed variable length code table and outputs the encoded quantization range data.

The encoded outputs from the VLCs 6 and 14 through 17 are applied to a macro block layer construction circuit 18. The macro block layer construction circuit 18 rearranges the input data and outputs them as macro block layer data.

FIG. 4 is a block diagram showing a decoding apparatus for decoding encoded data of the macro block layers.

The headers of the macro block layers are extracted by a decoding processor (not shown) from the encoded output of the MPEG system, and the data of the macro block layers are input to a data separator 20. The data separator 20 reads the input bits stream sequentially and, by separating the encoded coefficient output, the encoded address output, the encoded pattern output, the encoded quantization range data output and the encoded motion vector output, outputs them to a coefficient VLD (variable length decoding circuit) 21, an address VLD 22, an encoded block pattern VLD 23, a quantization range VLD 24 and a motion vector VLD 25, respectively.

The encoded block pattern VLD 23 decodes the encoded pattern output and outputs pattern data indicating encoded blocks in the macro block to the coefficient VLD 21 and a data reconstruction circuit 30. The coefficient VLD 21 is applied with the encoded coefficient output from the data separator 20 and is given an instruction on a block having a significant transformation coefficient by the pattern data, and by decoding this block in a variable length, outputs it to a block split circuit 26. The block split circuit 26 executes the blocking of the output of the coefficient VLD 21 and applies the blocked output to the inverse quantizer 27.

The quantization range VLD 24 decodes the encoded quantization range data output from the data separator 20 and outputs the quantization range data to the inverse quantizer 27. Using this quantization range data, the inverse quantizer 27 executes the inverse quantization and regenerates the data before the quantization at the encoding side. Further, the inverse DCT circuit 28 executes the inverse DCT processing of the inversely quantized output to restore it to the pixel data before the DCT processing at the encoding side and outputs them to the switch 29.

The motion vector VLD 25 decodes the encoded motion vector output from the data separator 20 and outputs the motion vector to a reference block reading circuit 33 and also outputs a signal indicating whether the macro block has been intra-frame encoded or prediction encoded to the switch 29. If the motion vector VLD 25 indicates that the macro block has been intra-frame encoded, the switch 29 selects the terminal a and if it has been prediction encoded, selects the terminal b.

If the input macro block is the intra-frame encoded macro block, the output of the inverse DCT circuit 28 is applied to the data reconstruction circuit 30 through the terminal a of the switch 29. The address VLD 22 decodes the encoded address output from the data separator 20 and specifying the location of the macro block, applies the macro block address to the data reconstruction circuit 30. The data reconstruction circuit 30 is also applied with pattern data from the encoded block pattern VLD 23. The data reconstruction circuit 30 reconstructs the macro block data based on the address and pattern data of the macro block and outputs them.

On the other hand, if the input macro block is a prediction encoded macro block, the output of the inverse DCT circuit 28 is applied to an adder 31 through the terminal b of the switch 29 and also, to an M frame picture memory 32. In this case, the output of the inverse DCT circuit 28 is a differential value with a reference macro block and this differential value is delayed by M frames by the M frame picture memory 32. A reference block read circuit 33 executes the blocking of the output of the M frame picture memory 32 and outputs the blocked output to the adder 31 as a reference macro block. The adder 31 adds up the decoded output of the reference frame from the inverse DCT circuit 28 with the decoded output of the current frame to regenerate video signals of the current frame and outputs them to the data reconstruction circuit 30.

Further, if the input macro block is an intra-picture encoded macro block, where no encoded motion vector output exists, the motion vector VLD 25 does not operate.

FIG. 5 is a block diagram showing such a conventional video data encoding apparatus as described above.

Picture frame data is input to an input terminal 1001. This picture frame data is framed picture signals. The picture frame data is applied to a blocking circuit 1002. The blocking circuit 1002 divides the picture frame data into two-dimensional data of horizontal m pixels×vertical n lines (hereinafter referred to block data) and outputs them to a motion detector 1005 and also to a DCT circuit 6 through a switch 1004.

Now, it is assumed that the intra-fame encoding mode has been designated. In this case, the switch 1004 selects the terminal a. A signal composed of m pixels×n pixels per block is input to the DCT circuit 1006 and the DCT circuit 1006 transforms the input signal into frequency components through the m×n two-dimensional DCT process. This makes it possible to reduce the spatial correlation components. That is, the output of the DCT circuit 1006 (the transformation coefficient) is applied to a quantizer 1007 which reduces one block signal redundancy by requantizing the transformation coefficient in a prescribed quantization range. Further, the quantization range of the quantizer 1007 is decided based on generated encoding quantity, assigned set encoding quantity, etc. Further, a DST (Digital Sine Transformation) circuit, FFT (Fast Fourier Transformation) circuit, WHT (FAST Walsh-Hadamard) circuit, FH (Fast Haar) transformation circuit, FS (Fast Slant) transformation circuit, KLT (Fast Karhunen-Loeve) transformation circuit), etc. may be used instead of the DCT circuit.

The switching of the switch 1004 might be decided in advance based on the encoding system and may be decided based on the amount of correlation between the reference block data from a motion compensator 1016, which will be described later and the block data from the blocking circuit 1002.

The quantized data from the quantizer 1007 are applied to a variable length encoder 1008 and are encoded in variable length based on a prescribed variable length table, for instance, the Huffman code table, and the encoded data is output. As a result, a short time sequence of bits is assigned to data having a high appearance probability, and a long time sequence of bits is assigned to data having a low appearance probability and thus, transmission quantity is further reduced. The encoded output from the variable length encoder 1008 is applied to a multiplexer (hereinafter referred to as MUX) 9, which outputs the encoded output from the variable length encoder 1008 with header data such as address data, etc. added through an output terminal 1010 as picture data.

On the other hand, in the inter-frame compression encoding mode, the switch 1004 selects the terminal b. The block data from the blocking circuit 1002 is applied to a subtractor 1011. The subtractor 1011 outputs a difference between the current frame block and the motion compensated reference picture block (hereinafter referred to as the reference block,) which will be described later, for every pixel data to the DCT circuit 1006 as a prediction error. In this case, the DCT circuit 1006 processes the differential data through the DCT process.

The reference block is obtained by decoding the quantized output. That is, the output of the quantizer 1007 is also applied to an inverse quantizer 1012. The quantized output of the quantizer 1007 is inversely quantized by the inverse quantizer 1012 and is further inverse DCT processed in an inverse DCT circuit 1013 and restored to the original picture signal. Since the output of the subtractor 1011 is differential information, the output of the inverse DCT circuit 1013 is also differential information. The output of the inverse DCT circuit 1013 is applied to an adder 1014. The output of the adder 1014 is applied to a picture memory 1015, a motion compensator 1016 and a switch 1017 and then, is returned to the adder 1014. The adder 1014 plays back the current frame block data (the local decoded data) by adding differential data to the reference block data from the motion compensator 1016 and outputs the result to the picture memory 1015. The picture memory 1015 stores the block data from the adder 1014 in a location corresponding to the picture frame.

The picture memory 1015 outputs the local decoded data from the adder 1014 to the motion compensator 1016 and the motion detector 1005 by delaying it by, for instance, one frame period. The motion detector 1005 detects a motion vector in the current frame block data from the blocking circuit 1002 and the reference picture block data from the picture memory 1015 and outputs it to the motion compensator 1016. The motion compensator 1016 corrects the blocked location of the preceding frame local decoded data according to the motion vector and outputs it to the subtractor 1011 as the motion compensated reference block. Thus, the motion compensated preceding frame data is applied to the subtractor 1011 as the reference block and the DCT process is carried out for the prediction error from the subtractor 1011. Further, the switch 1017 is interlocked with the switch 1004. That is, when the switch 1004 selects the terminal a, the switch 1017 is turned OFF and when the switch 1004 selects the terminal b, the switch 1017 is turned ON, and the preceding frame block data is applied to the adder 1014.

Further, the motion detection may be carried out using a picture frame that is one frame preceding the encoding. Therefore, the picture frame data input through the input terminal 1001 is also applied to the picture memory 1003. The picture memory 1003 outputs the picture frame data to the motion detector 1005 by delaying it by one frame period. In this case, the motion detector 1005 obtains a motion vector between the current frame block data from the blocking circuit 1002 and the one frame preceding block data in the picture memory 1003 and outputs it to the motion compensator 1016. Further, the motion vector from the motion detector 1005 is also applied to the variable length encoder 1008 and encoded in variable length and is output by the variable length encoder 1008 based on the prescribed variable length code table.

Next, the operation of the motion detector 1005 will be explained with reference to FIG. 6.

FIG. 6(a) shows the preceding frame picture from the picture memory 1003 or 1015 and FIG. 6(b) shows the current frame picture from the blocking circuit 1002. That is, as shown in FIGS. 6(a) and 6(b), out of the preceding frame picture, the rectangular picture A moves to the upper right side and the current frame picture B is constructed. In this case, it is considered that a block containing the picture A moved in the direction and quantity shown by the motion vector V.

To obtain this motion vector V, the motion detector 1005 first divides the current frame into horizontal X pixels× vertical Y pixels blocks. A search range of horizontal U pixels×vertical V pixels centering around the preceding frame block of which the relative positional relationship is the same as the current block is set. By shifting the current frame blocks in unit of one pixel in the search range, the matching calculation is carried out for each pixel between all pixels of the current frame blocks and the corresponding pixels of the preceding frame, and a cumulative value of a difference between the pixels is obtained. The block which obtained a cumulative value having the lowest value is the block matched reference block and a vector indicating the positional relationship between the location of this reference block and that of the current frame block is obtained as the motion vector V as shown in FIG. 6(b).

In FIGS. 6(a) and 6(b), if it is assumed that the portion other than the rectangluar picture A is a flat and white picture, the preceding frame and the current frame differs in only the portions corresponding to the pictures A and B. The motion compensator 1016 compensates the motion of the preceding frame picture reference block from the picture memory 1015 to the location corresponding to a block containing the picture B based on the motion vector shown in FIG. 6(b). As a result, the same picture as shown in FIG. 6(b) is output from the motion compensator 1016 to the subtractor 1011. The subtractor 1011 obtains a difference between the current frame picture (see FIG. 6(b)) from the blocking circuit 1002 and the motion compensated reference frame picture (the same picture as in FIG. 6(b)) from the motion compensator 1016. In this case, the difference value becomes zero and the coding quantity can be reduced greatly. FIG. 7 is a block diagram showing a conventional video data decoding apparatus for decoding encoded data.

Encoded data is input to a data separator 1020 through an input terminal after the header of each layer is extracted by a decoding processor (not shown). The data separator 1020 sequentially reads the input bit stream and separates the encoded data of the DCT coefficient (encoded coefficient data), encoded data of the quantization range and encoded data of the motion vector, and outputs them to a coefficient VLD (a variable length decoder) 1021, a quantization range VLD 1024 and a motion vector VLD 1025, respectively. The coefficient VLD 1021 decodes encoded coefficient data in variable length to restore it to the data before the variable length encoding at the encoding side and outputs it to an inverse quantizer 1027.

The quantization range VLD 1024 decodes quantization range encoded data from the data separator 1020 and outputs the quantization range data to the inverse quantizer 1027. The inverse quantizer 1027 plays back the data before the quantization at the encoding side by carrying out the inverse quantization using the quantization range data. Further, an inverse DCT circuit 1028 restores the inversely quantized output to the pixel data before the DCT process at the encoding side by inverse DCT processing and outputs the restored data to the switch 1029.

The motion vector VLD 1025 decodes the motion vector encoded data from the data separator 1020 in variable length and outputs a motion vector to a reference block read circuit 1033 and also, outputs a signal indicating whether the block is an intra-frame encoded or prediction encoded block to the switch 1029. If the motion vector VLD 1025 indicates that the block is an intra-frame encoded block, the switch 1029 selects the terminal a and if it is a prediction encoded block, the switch selects the terminal b.

If the input block is an intra-frame encoded block, the output of the inverse DCT circuit 1028 is applied to a data reconstruction circuit 1030 through the terminal a of the switch 1029. The data reconstruction circuit 1030 reconstructs and outputs block data according to the block address.

On the other hand, if the input block is a prediction encoded block, the output of the inverse DCT circuit 1028 is applied to an adder 1031 through the terminal b of the switch 1029 and further, the output of the adder 1031 is applied to a picture memory 1032. In this case, the output of the inverse DCT circuit 1028 is a differential value with the reference block and this differential value is delayed by, for instance, one frame by the picture memory 1032. The reference block readout circuit 1033 blocks the output of the picture memory 1032 at the blocking location based on the motion vector and outputs it to the adder 1031 as a reference block. The adder 1031 plays back the current frame picture signal by adding the reference frame decoded output from the inverse DCT circuit 1028 with the current frame decoded output and outputs the current frame picture signal to the data reconstruction circuit 1030.

Further, if the input block is an intra-frame encoded block, there exists no motion vector encoded data, and the motion vector VLD 1025 does not operate. Further, if a transformation other than the DCT was carried out at the encoding side, the inverse transformation corresponding to that transformation is carried out.

By the way, in certain video program softwares there are brutal and violent scenes, etc., which are not proper for looking and listening by children, minors and the like. These scenes must be partially or entirely cut or displayed in a mosaic for some countries. The necessity of such a special display differs depending upon each country, and a software supplier must execute the picture processing corresponding to the respective countries. However, the apparatus described above is simply for encoding and decoding video program software and cannot select whether a part of video program software is to be in a special display or normal display.

Further, it is considered possible to display such brutal and violence scenes in mosaic, for instance, by controlling quantization coefficients at the encoding side. However, as described above, a prediction error only is quantized by the DCT process on the picture frames adopting the inter-frame encoding. On a general picture, there was such a problem that a prediction error is relatively small and even when quantization coefficients are controlled when encoding a prediction error, a resolution of playback picture of encoded blocks is relatively high and a sufficient mosaic display cannot be obtained.

As described above, there was such a problem that a software supplier had to execute individual picture processing since it was not possible to select whether a part of a picture or the entire picture should be displayed specially or normally.

On the other hand, in the conventional video data encoding apparatus there was a problem that it was not possible to select the special display or the normal display of a part of or the entirety of a picture. Further, there was another problem that the special playback, for instance, a mosaic display, etc. cannot be carried out effectively when the motion compensation prediction encoding is made.

SUMMARY OF THE INVENTION

It is, therefore, an object of the present invention to provide a video data arranging method which is capable of selecting whether a part of or the entire picture is to be specially or normally displayed, and its encoding and decoding apparatus.

Another object of the present invention is to provide a video data encoding apparatus and a video data decoding apparatus which are capable of enabling an effective special playback even when the motion compensation prediction encoding is adopted.

In order to achieve the above objects, a video data arranging method according to the first aspect of the present invention includes the steps of:

providing a normal bit stream region in which normal playback block codes for normal playback of prescribed picture blocks and special playback block codes for special playback of prescribed picture blocks can be arranged; and providing a extension bit stream region for arranging block codes which are not arranged in the normal bit stream region out of the normal playback block codes and the special playback block codes when there are the normal playback block codes and the special playback block codes for prescribed picture blocks.

A video data encoding apparatus according to the second aspect of the present invention includes:

means for blocking picture data into prescribed block data;

normal encoding means for generating the normal playback block codes for normal playback by encoding the block data;

special encoding means for generating special playback block codes for special playback by encoding the block data;

selection means for applying the block data to the normal encoding means only when the block data is to be used for a normal playback display and for applying the block data to both the normal encoding means and the special encoding means when the block data is to be used for a special playback display;

location information encoding means for encoding the location information for specifying locations of the block data to be used for the special playback display; and data reconstructing means for arranging the output from the normal encoding means, the special encoding means and the location information encoding means in a prescribed syntax by making them correspond with the locations on the picture frame based on the location information.

A video data encoding apparatus according to the third aspect of the present invention includes:

normal playback block code extracting means for extracting normal playback block codes in receipt of input data containing both a normal playback block code for a normal playback and a special playback block code for a special playback when the special payback block code is arranged;

special playback block extracting means for extracting the special playback block codes;

reconstruction means for reconstructing data by selecting one of the output of the normal playback block extracting means and the output of the special playback block extracting means; and decoding means for decoding the output of this reconstruction means.

A video data encoding apparatus according to the fourth aspect of the present invention includes:

intra-frame encoding means for encoding input picture data for each block in the intra-frame encoding mode;

motion detecting means for detecting the motion of a current frame picture between the current frame picture and a prescribed reference picture and for outputting a motion vector;

motion compensating means for compensating the motion of the prescribed reference picture using the motion vector and for outputting the motion compensated reference picture;

inter-frame encoding means for-obtaining a prediction error between the current frame and the motion compensated reference picture when the input picture data is applied and for encoding this prediction error for each block in the motion compensating prediction encoding mode;

control means for controlling the intra-frame encoding means to output the encoded output for the normal playback for normal playback blocks and to output the encoded output for the special playback for special playback blocks; and special playback control means in which the prediction error is made larger than errors in the encoding operation for normal playback blocks if the blocks to be encoded are special playback blocks.

A video data encoding apparatus according to the fifth aspect of the present invention includes:

intra-frame decoding means for reproducing picture data by decoding the encoded data that have been encoded in the intra-frame encoding mode and the motion compensation prediction encoding mode;

inter-frame decoding means for reproducing picture data by adding a prescribed motion compensated reference picture with a prediction error while obtaining a prediction error by decoding the encoded data and extracting a motion vector contained in the encoded data to compensate for the motion of a prescribed picture; and switching means for generating a motion compensated reference picture using a special playback motion vector in place of the motion vector extracted from the encoded data by controlling the inter-frame decoding means if a block to be decoded is a special playback block.

A video data encoding apparatus according to the sixth aspect of the present invention includes:

decoding means for reproducing picture data by decoding encoded data in receipt of an encoded data containing information of special playback block location; and data reconstruction means for reconstructing picture data using a prescribed specific data in place of the output of the decoding means of the information of special playback block location when indicated that a block to be decoded is a special playback block.

A video data encoding apparatus according to the seventh aspect of the present invention includes:

decoding means having variable length decoding means, inverse quantizing means and inverse orthogonal transforming means for reproducing picture data by decoding encoded data using an information of quantization range extracted from the encoded data when the encoded data containing the information of quantization range at the time of encoding is input; and switching means for decoding block data using the information of quantization range for special playback in place of the information of quantization range extracted from the encoded data by controlling the decoding means when a block to be decoded is a special playback block.

In the video data arranging method according to the first aspect of the present invention, normal playback block codes for normal playback display operation for prescribed picture blocks are arranged in a normal bit stream region. Special playback block codes for special playback display operation for prescribed picture blocks are arranged in one side of the normal bit stream region or an extension bit stream region. Further, the normal playback block codes corresponding to the special playback block codes are arranged in the other side of the normal bit stream region or the extension bit stream region. For instance, if the special playback block codes are arranged in the normal bit stream region, it becomes possible to display a picture which is partially processed in a mosaic by regenerating the normal bit stream region. Further, in this case, if the corresponding normal playback block codes for the mosaic processed blocks are arranged in the extension bit stream region, it is also possible to display a normal picture using the normal playback block codes arranged in this region.

In the video data encoding apparatus according to the second aspect of the present invention, it is possible to conduct a special playback display operation on a prescribed picture block since, the selection means applies block data to both the normal encoding means and the special encoding means. As a result, a normal playback block code and special playback block code are generated for this block. The location information encoding means encodes location information for making it possible to specify a special playback block code and a normal playback block code for the same block. The data reconstruction means arranges the outputs of the normal encoding means, the special encoding means and the location information encoding means in a prescribed syntax corresponding to the locations on the picture frame based on the location information.

In the video data encoding apparatus according to the third aspect of the present invention, the normal playback block code extracting means extracts normal playback block codes from the input data, and the special playback block code extracting means extracts special playback block codes. The data reconstruction means selects one of the outputs of the normal playback block code extracting means and the special playback block code extracting means and reconstructs data. As a result, it becomes possible to display a normally regenerated picture and also, it becomes possible to display, for instance, a partially mosaic processed picture.

In the video data encoding apparatus according to the fourth aspect of the present invention, the motion detecting means detects a motion between the current frame picture and a prescribed reference picture and outputs a motion vector. Using this motion vector, the motion compensating means compensates the motion of the reference picture and generates a motion compensated reference picture. The inter-frame encoding means obtains a prediction error between the current frame picture and the motion compensated reference picture and encodes it. As to special playback blocks, a prediction error is set larger than the errors occurring when encoding normal playback blocks. Therefore, even in the motion compensation prediction encoding mode, it becomes possible to transmit sufficient power. For special playback blocks, an encoded data quantized at a quantization range sufficiently wider than the range encountered when encoding normal playback blocks is output by the control means.

In the video data decoding apparatus according to the fifth aspect of the present invention, if data encoded in the intra-frame encoding mode is input, a picture data is reproduced by the intra-frame decoding means. If data encoded in the motion compensation prediction encoding mode is input, a prediction error is obtained by the inter-frame decoding means, the motion of the prescribed reference picture is compensated using a motion vector, and picture data is reproduced by adding the prediction error and the motion compensated reference picture. In the case where a block to be decoded is a special playback block, a motion compensated reference picture is generated using a motion vector for the special playback instead of the motion vector extracted from encoded data by the switching means. As a result, the adding result of the prediction error and the motion compensated reference picture is made different from an actual picture and they are specially played back and displayed effectively.

In the video data decoding apparatus according to the sixth aspect of the present invention, the input encoded data contains information on locations of special playback blocks. Encoded data is decoded by the decoding means. If it is indicated that a block to be decoded is a special playback block, the data reconstruction means reconstructs picture data instead of prescribed specific data using the output of the decoding means. As a result, a special playback block is specially played back and displayed effectively.

In the video data decoding apparatus according to the seventh aspect of the present invention, the decoding means decodes encoded data using information of the quantization range extracted from encoded data. If a block to be decoded is a special playback block, the switching means decodes the block using information of the quantization range for special playback instead of the information of the quantization range extracted from encoded data. As a result, a special playback block is specially played back and displayed effectively.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 14 is a block diagram showing the definite construction of an extension data tentative decoder shown in FIG. 13;

FIGS. 15(a) and 15(b) are block diagrams showing the definite construction of a slice data reconstruction circuit shown in FIG. 13;

FIG. 16 is an explanatory diagram for explaining the operation of the slice data reconstruction circuit shown in FIGS. 15(a) and 15(b);

FIG. 20 is an explanatory diagram for explaining the operation of the embodiment shown in FIG. 19;

FIGS. 22(a) and 22(b) are explanatory diagrams for explaining the motion detector shown in FIG. 21;

FIG. 24 is an explanatory diagram for explaining the embodiment shown in FIG. 23;

DESCRIPTION OF THE PREFERRED EMBODIMENTS

Figure 1:
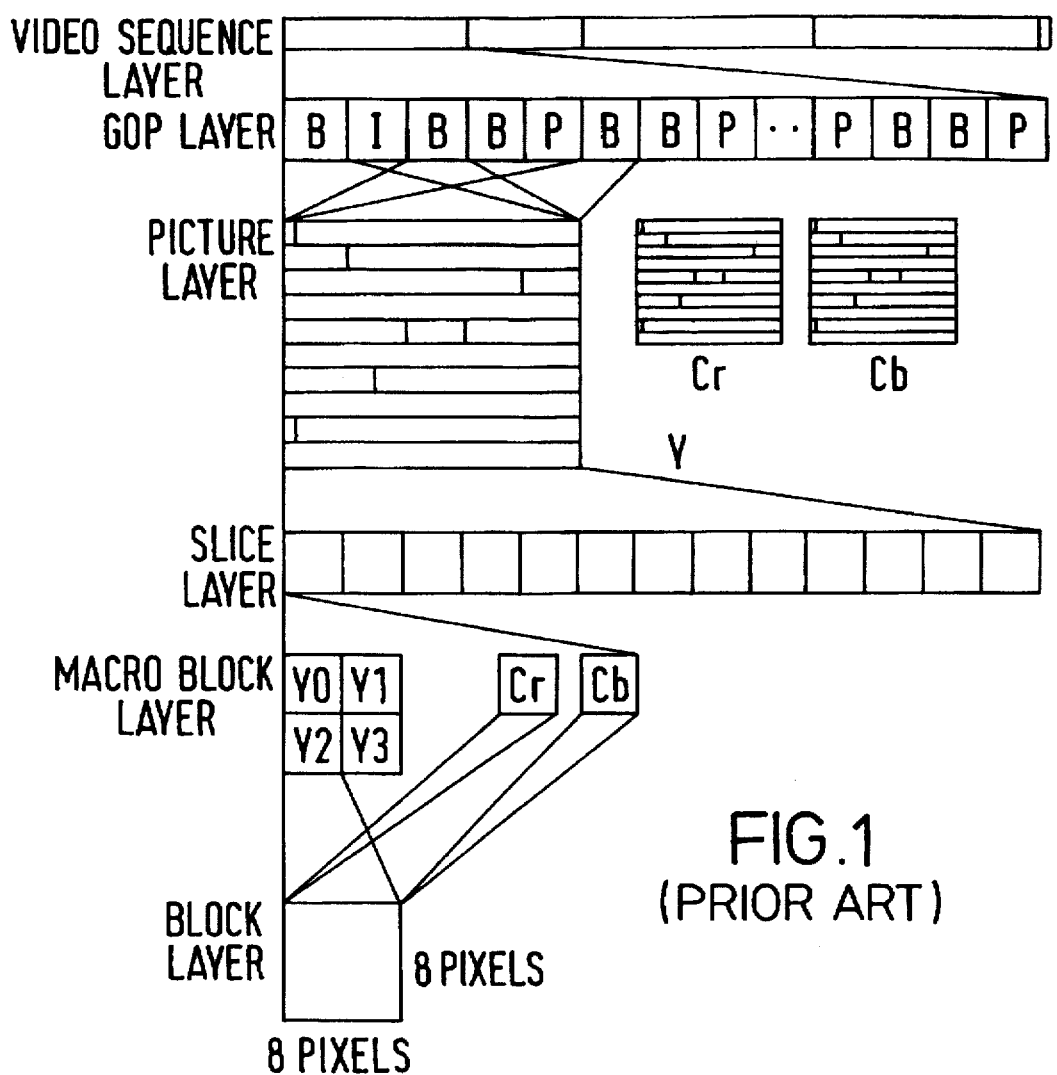
FIG. 1 is an explanatory diagram for explaining the hierarchical structure of the MPEG system.
Figure 2:
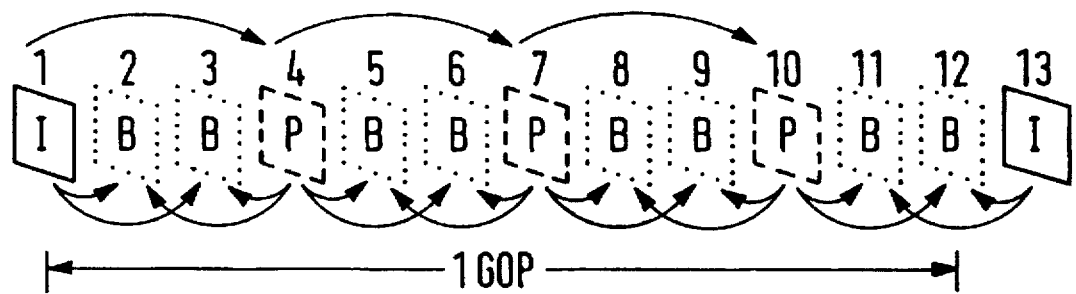
FIG. 2 is an explanatory diagram for explaining the construction of GOP.

The present invention will be described in detail with reference to the FIGS. 8 through 30. Throughout the drawings, like or equivalent reference numerals or letters will be used to designate like or equivalent elements for simplicity of explanation.

Preferred embodiments according to some aspect of the present invention will be described hereinafter with reference to the attached drawings, FIGS. 8 through 20.

Figure 8:
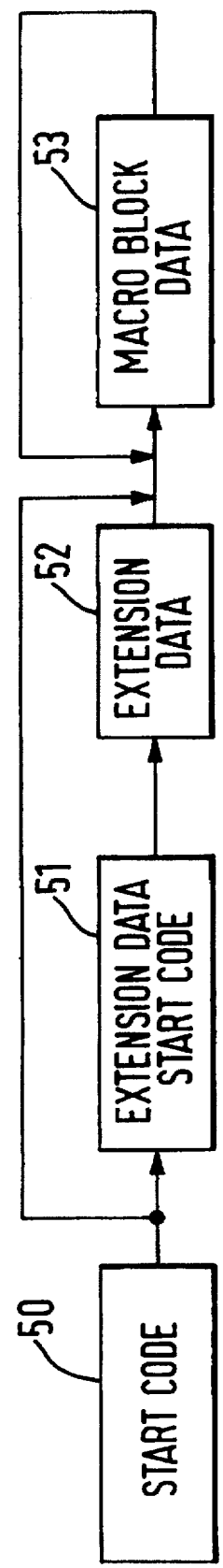
FIG. 8 is an explanatory diagram showing one embodiment of a video data arranging method of the present invention.

Referring now to FIG. 8, a first embodiment of the video data arranging method according to the present invention will be described in detail.

In this embodiment, considering a case where it is necessary to specially play back and display a part of or an entirety of a prescribed picture of a video program software, a region for arranging data for the normal playback display operation in units of macro blocks and a region for arranging data for the special playback display operation are provided in the slice layer. The syntax in this embodiment is nearly the same as the MPEG shown in FIG. 1. In this embodiment, the syntax of the slice layer differs from the MPEG.

FIG. 8 shows the syntax of the slice layer in this embodiment. A start code 50 is arranged at the top of the slice layer. The start code indicates the start of data of the slice layer. Then, after arranging an extension data start code 51 and an extension data 52, macro block data 53 that constitutes the normal bit stream region are arranged. The macro block data 53 can also be arranged without providing the extension bit stream region.

The extension data start code 51 is a code indicating the presence of the extension data 52, and if the extension data 52 are not present, the extension data start code 51 also is not present. The extension data 52 are arranged following the extension data start code 51. The extension data 52 are delimited in units of, for instance, bytes in order to make the ends location clear. When the extension data 52 end, the macro block data 53 of the macro block layer are arranged repeatedly by the number of macro blocks in the slice layer.

If the special playback display operation of a prescribed macro block is not necessary, data for the normal playback display operation of this macro block (hereinafter referred to as a normal playback macro block code) are arranged as the macro block data 53 in the normal bit stream region. Further, if the special playback display operation of a prescribed macro block is necessary, either data for the special playback display operation of this macro block (hereinafter referred to as the special playback macro block code) or a normal playback macro block code for this macro block is arranged as the macro block data 53.

Further, when the special playback display operation of a prescribed macro block in the extension bit stream region is necessary, a special playback macro block code for this macro block or a normal playback macro block code for this macro block is arranged in the extension bit stream region as the extension macro block code.

Further, if the special playback macro block code for the prescribed macro block is arranged as the extension data 52, the normal playback macro block code of this macro block is arranged for the macro block data 53 and if the normal playback macro block code of a prescribed macro block is arranged for the extension data 52, the special playback macro block code of this macro block is arranged for the macro block data 53.

By arranging video data as described above, it becomes possible to conduct the normal playback display operation and the special playback display operation of partially processed pictures by selecting the extension bit stream region and the normal bit stream region according to use when decoding video data.

Further, although the extension bit stream region is provided in the slice layer in FIG. 8, it may be provided in other layers than the slice layer, e.g., the picture layer, the GOP layer or the video sequence layer.

FIGS. 9(a) through 9(d) are explanatory diagrams showing a definite syntax of the extension data start code 51 and the extension data 52 which comprise the extension bit stream region shown in FIG. 8. Further, in FIGS. 9(a) though 9(d) only significant codes are shown and data of processing relative to bytes are omitted.

Figure 9A:
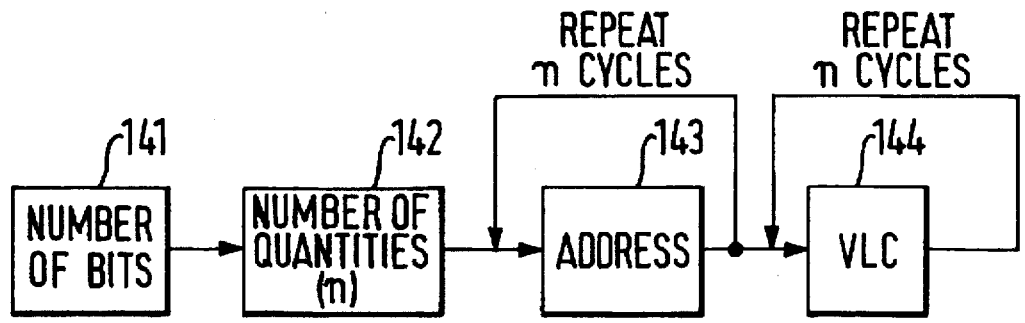
FIGS. 9(a) through 9(d) are explanatory diagrams showing definite syntaxes of an extension data 52 shown in FIG. 8.

In the example shown in FIG. 9(a), the number of bits 141, a fixed length code, is arranged at the top. By referring to this number of bits 141, it is possible to easily discriminate the number of skipping bits without having to detect the end location of the extension data by decoding the bits in the case where an extension data is not read when decoding the extension data. The number of quantities (n) 142 is arranged next to the number of bits 141. The number of quantities (n) 142 indicates the number of macro blocks contained in the extension data 52.

An address 143 showing the address of n pieces of macro blocks and VLC 144, which is macro block data encoded in variable length, is arranged next to the number of quantities (n) 142. If the number of bits of the address 143 and VLC 144 are fixed for the byte processing, etc., it becomes possible to skip the extension data by skipping n times the number of bits (bytes).

The address 143 is a code indicating an absolute display location of the macro block data in the extension bit stream region or a relative location of the macro block in the slice layer. This address 143 is comprised of a fixed or variable length code. By referring to this address 143, it becomes possible to decode macro block data in the corresponding extension bit stream region in place of the macro block data 53 in the normal bit stream region in the decoding process.

Further, although the VLC 144 for n pieces is arranged following the address 143 for n macro blocks, n pieces of combined data of the address 143 and VLC 144 may be arranged.

Figure 9B:
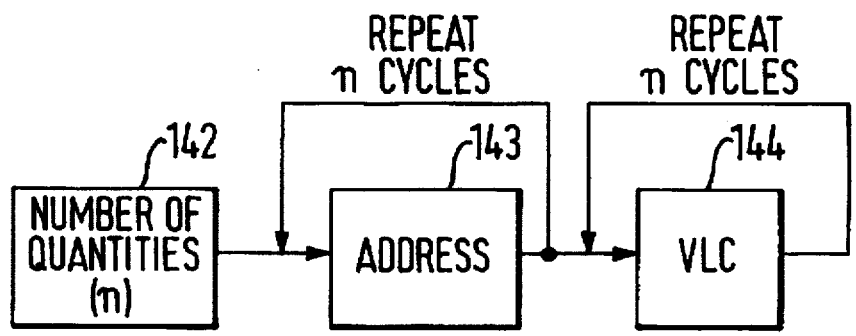

FIG. 9(b) shows the data arrangement with the number of bits 141 omitted. In this case, the decoding process for n pieces of data shown by the number of quantities (n) 142 is required to skip data in the extension bit stream region. Or, if the number of bits of the address 143 and VLC 144 are fixed for the byte processing, etc., as shown in FIG. 9(a), the number of n times the bits (bytes) only should be skipped.

Figure 9C:
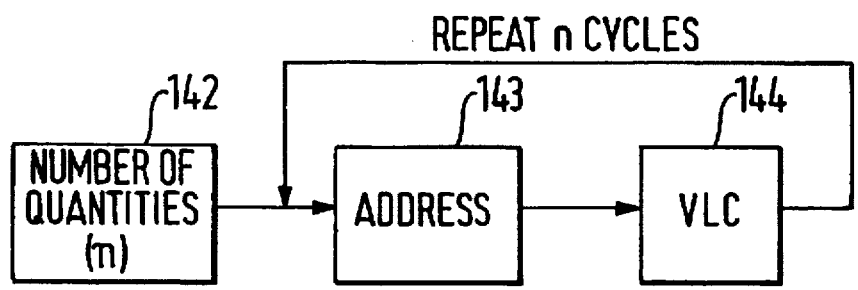

FIG. 9(c) shows a combination of the data of the address 143 and VLC 144 arranged repeatedly by n pieces of macro blocks.

Figure 9D:
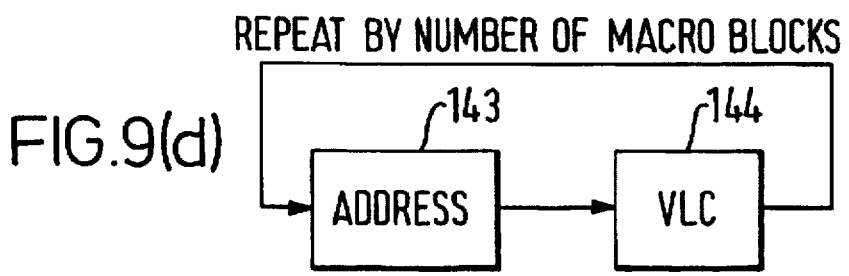

In FIG. 9(d), the number of quantities (n) is omitted. Combination data of the address 143 and VLC 144 are arranged repeatedly by the number of macro blocks. Further, like FIGS. 9(a) and 9(b), the VLC 144 may be arranged repeatedly by the number of macro blocks after arranging the address 143 by the number of macro blocks.

Further, in FIGS. 9(a) through 9(d) the variable length VLC 144, an actual data, is arranged but a fixed length code may be arranged.

Figure 10:
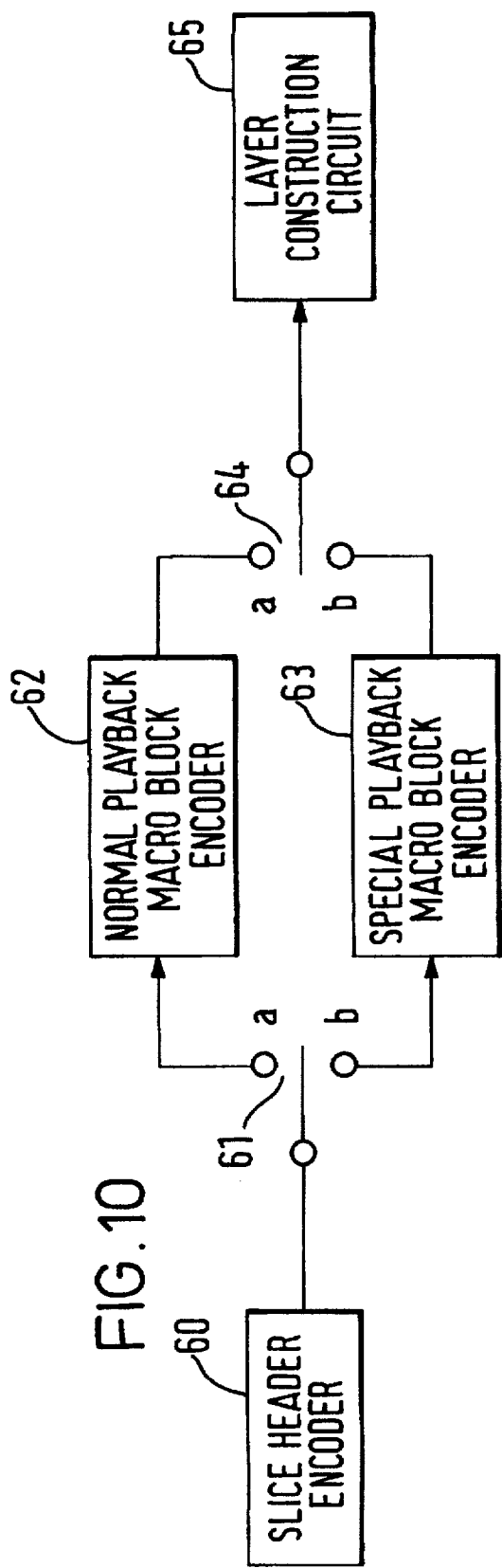
FIG. 10 is a block diagram showing one embodiment of an encoding apparatus of the present invention.

FIG. 10 is an explanatory diagram showing one embodiment of an encoding apparatus of the present invention. FIG. 10 shows an encoding apparatus of the slice layer.

A slice header encoder 60 generates a start code 50 (as shown in FIG. 8) indicating the start of the slice layer and encodes data showing the address of the slice layer. Switches 61 and 64 are controlled by a control signal (not shown) and are changed over interlocking with each other in units of macro blocks. That is, when generating data for the normal playback display operation of a prescribed macro block, the switches 61 and 64 select the terminal a and when generating data for the special playback display operation of a prescribed macro block, select the terminal b.

Figure 3:
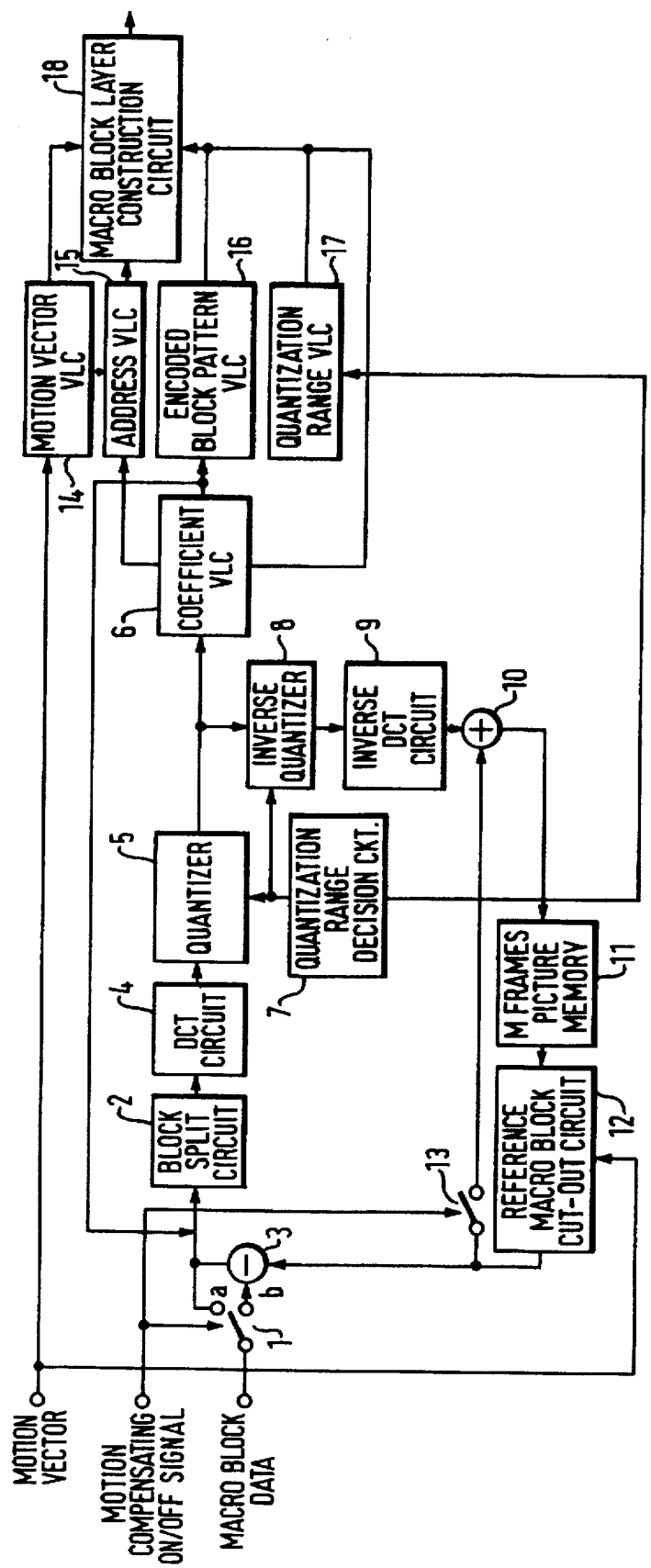
FIG. 3 is a block diagram showing an encoding apparatus corresponding to the MPEG system.

A normal playback macro block encoder 62 has the same structure as in FIG. 3 and input macro block data is encoded and output as a normal playback macro block code. A special playback macro block encoder 63 executes the special playback encoding process and the normal playback encoding process for a macro block to be specially played back and displayed and outputs a special playback macro block code and a normal playback macro block code.

A layer construction circuit 65 is applied with the outputs of the slice header encoder 60, the normal playback macro block encoder 61 and the special playback macro block encoder 63 and constructs a syntax of the slice layer as shown in FIG. 8.

Next, the operation of the embodiment in the construction as described above will be explained. Further, in this embodiment, the operation will be explained assuming that the normal playback macro block code is arranged for the extension data 52 shown in FIG. 8 and the special playback macro block code is arranged for the macro block data 53. That is, in this case, data for the special playback are included in the normal bit stream region.

The start code 50 of the slice layer is generated by the slice header encoder 60. If a prescribed macro block does not require the special playback display operation, both of the switches 61 and 64 select the terminal a. In this case, the encoding of the prescribed macro block is executed and a normal playback macro block code is output as before. A layer construction circuit 65 arranges the normal playback macro block code as data of the macro block data 53.

If a prescribed macro block requires the special playback display operation, the switches 61 and 64 select the terminal b. Then, the special playback macro block encoder 63 operates and executes the normal and special playback encoding processes for this macro block. The special playback macro block code and the normal playback macro block code from the special playback macro block encoder 63 are applied to the layer construction circuit 65 through the switch 64.

The layer construction circuit 65 arranges the start code from the slice header encoder 60 at the top location of the slice layer. The layer construction circuit 65 sequentially arranges data of macro blocks required no special playback display operation; that is, the normal playback macro block codes from the normal playback macro block encoder 61 are sequentially arranged as the macro block data 53. And the layer construction circuit 65 also arranges special playback macro block codes for macro blocks requiring the special playback display operation as the macro block data 53. That is, for the macro block data 53 in the normal bit stream region, a special playback macro block code is arranged at the location corresponding to a prescribed macro block in a picture requiring the special playback display operation and a normal playback macro block code is arranged in the other portion. Further, a normal playback macro block code for a prescribed macro block in a picture requiring the special playback display operation is arranged as the extension data 52 by the layer construction circuit 65. The syntax of the slice layer shown in FIG. 8 is thus formed.

Figure 11:
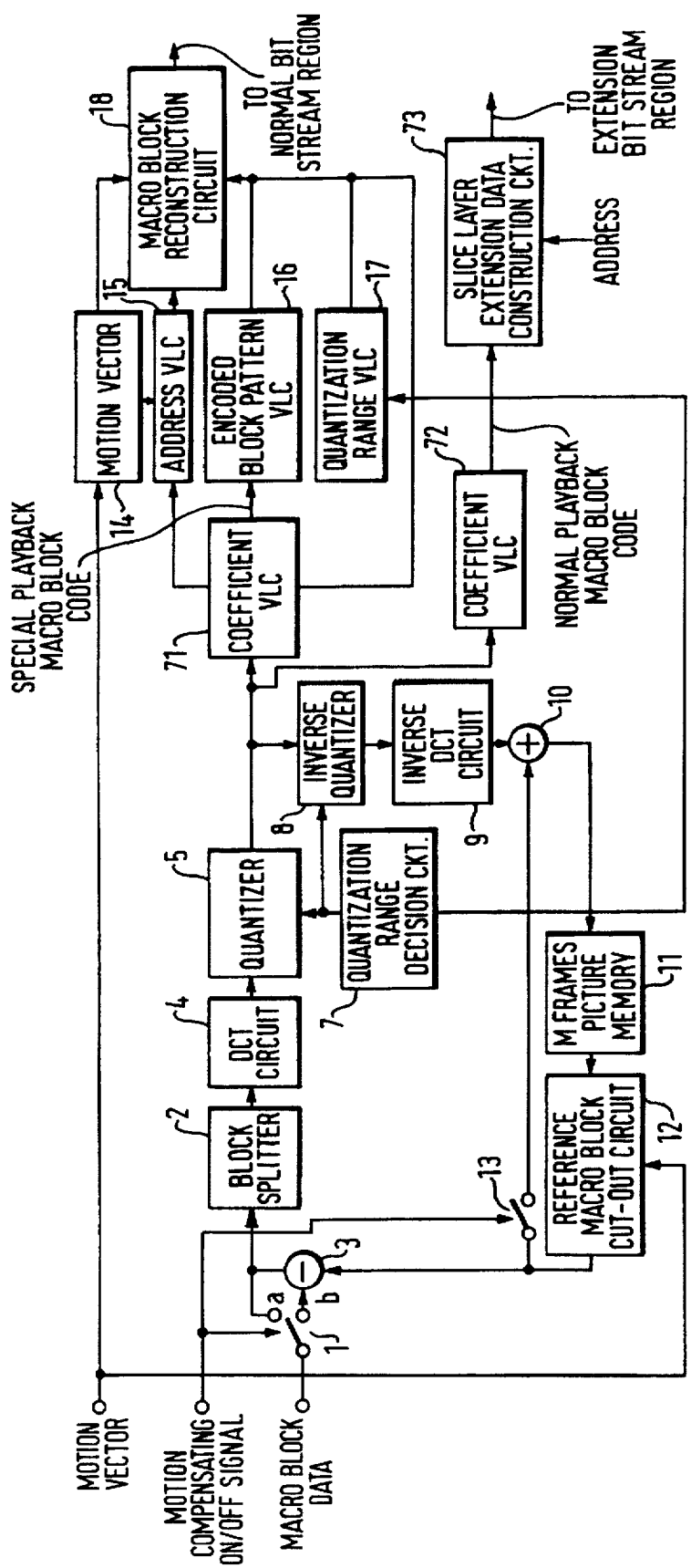
FIG. 11 is a block diagram showing the definite construction of a special playback macro block encoding apparatus shown in FIG. 10.

FIG. 11 is a block diagram showing a definite structure of the special playback macro block encoder 63 shown in FIG. 10. In FIG. 11, the same reference numerals are used to designate the same component elements as in FIG. 3.

In FIG. 11, macro block data of the macro block layer shown in FIG. 1, required for the special playback display operation, are input to a switch 1. The switch 1 selects the terminal a when the motion compensating ON/OFF signal indicates an intra-picture encoding mode and selects the terminal b when the motion compensating prediction encoding mode is indicated. The terminal b of the switch 1 is connected to the subtractor 3. The subtractor 3 outputs a prediction error by subtracting the macro block data of the current frame and the motion compensated reference macro block data for every pixel. This predicted error or the macro block data from the terminal a of the switch 1 is applied to the block split circuit 2.

The block split circuit 2 splits a macro block data into, for instance, blocks in unit of 8 pixels×8 pixels and outputs the split block data to the DCT circuit 4. The DCT circuit 4 is applied with block data and, by transforming a spatial coordinate component into a frequency component by the DCT process, outputs the transformed frequency component to the quantizer 5. The quantization range decision circuit 7 decides a quantization range in the quantizer 5 based on amount of used codes (amount of generated codes), amount of set codes, etc. The quantizer 5 quantizes a DCT transformation coefficient based on the quantization range data and outputs to the coefficient VLCs 71, 72 and the inverse quantizer 8.

The inverse quantizer 8 inverse quantizes the quantized output using the quantization range data applied from the quantization range decision circuit 7 and outputs the result to the inverse DCT circuit 9 for generating a reference macro block. The inverse DCT circuit 9 executes the inverse DCT processing of the inversely quantized output and outputs the result to the adder 10. The adder 10 regenerates the current frame data by adding up the reference frame data from a switch 13 with the decoded output of the current frame and outputs the regenerated current frame data to the M frame picture memory 11. Further, the switch 13 is kept off for a macro block requiring no motion compensation and the adder 10 does not execute the adding process.

The M frame picture memory 11 outputs the output (local decoded data) of the adder 10 to the reference macro block cut-out circuit 12 as reference frame data by delaying it by an M frame period. The reference macro block cut-out circuit 12 is also applied with a motion vector. The reference macro block cut-out circuit 12 compensates the reference frame blocking location using the motion vector, generates the motion compensated reference macro block, and outputs it to the subtractor 3 and also to the adder 10 through the switch 13. The switch 13 is turned ON only when executing the motion compensation.

Figure 12:
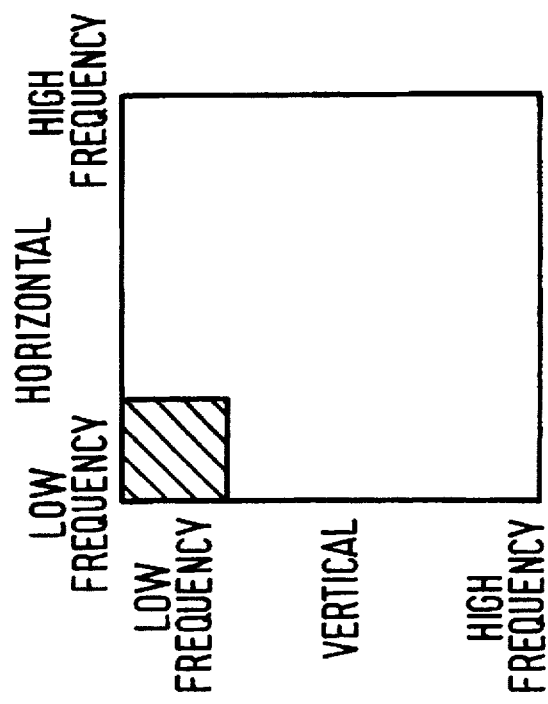
FIG. 12 is an explanatory diagram for explaining the operation of the special playback macro block encoding apparatus shown in FIG. 11.

FIG. 12 is an explanatory diagram for explaining a coefficient VLC 71.

The DCT circuit 4 executes the DCT processing of 8×8 pixel block data to obtain 8×8 DCT transformation coefficients ranging from the horizontal and vertical low to high frequency ranges. After quantizing, the DCT transformation coefficients are sequentially input to the coefficient VLC 71 from the horizontal and vertical low frequency range toward the high frequency range. The coefficient VLC 71 encodes only the quantized output corresponding to a part of the DCT transformation coefficients of the horizontal and vertical low range shown in the hatched section in FIG. 12 in variable length according to the prescribed variable length code table and outputs them as special playback macro block codes. Further, if a part of the DCT transformation coefficients of the horizontal and vertical low range shown in the hatched section in FIG. 12 are, for instance, all zero and no significant coefficient exists, the coefficient VLC circuit 71 outputs a code indicating the end of the block.

Referring back to FIG. 11, the motion vector VLC 14 encodes motion vector data in a block requiring the motion compensation according to the variable length code table and outputs the motion vector encoded output to the macro block layer construction circuit 18. The address VLC 15 encodes a difference between the address of a macro block in which a coefficient and motion vector to be encoded exist and the address of an encoded macro block immediately before it according to the prescribed variable length code table based on the outputs of the coefficient VLC 71 and the motion vector VLC 14 and outputs the encoded address output. The encoded block pattern VLC 16 encodes pattern data showing a block containing coefficients other than zero based on the output from the coefficient VLC 71 using the prescribed variable length code table and outputs the encoded pattern output. The quantization range VLC 17 encodes the quantization range data decided by the quantization range decision circuit 7 according to the prescribed variable length code table and outputs the encoded quantization range data.

The encoded outputs from the VLCs 71 and 14 through 17 are applied to the macro block layer construction circuit 18. The macro block layer construction circuit 18 rearranges the input data and outputs them as the data of the normal bit stream region.

On the other hand, the quantized output from the quantizer 5 is also applied to a coefficient VLC 72. The coefficient VLC 72 encodes the quantized output corresponding to the significant DCT transformation coefficient in variable length and outputs the result to a slice layer extension data construction circuit 73 as a normal playback macro block code. The slice layer extension data construction circuit 73 generates an address showing the location of the macro block and outputs the normal playback macro block code as the data of the extension bit stream region.

Next, the operation of the embodiment in the construction as described above will be explained.

Macro block data for a picture requiring the partial cut or mosaic display are input to the switch 1. In the intra-picture encoding mode, the switch 1 selects the terminal a and macro block data is input to the block split circuit 2 through the switch 1. After blocking the macro block data by the block split circuit 2. The macro block data DCT processed by the DCT circuit 4. The DCT transformation coefficient is applied to the quantizer 5 for quantization and the quantized DCT transformation coefficient is output to the coefficient VLCs 71 and 72.

On the other hand, in the prediction encoding mode, the quantized output is also applied to the inverse quantizer 8 for the inverse quantization. Further, the inversely quantized data is restored to the original data through the inverse DCT process in the inverse DCT circuit 9. This data is differential information and when the adder 10 executes the motion compensation, this data is added up with the reference macro block from the switch 13 and the current frame data is played back. The local decoded data from the adder 10 are applied to the M frame picture memory 11 and delayed by M frames, and the reference frames are applied to the reference macro block cut-out circuit 12. The reference macro block cut-out circuit 12 compensates the blocking locations of the reference frames based on the motion vector and generating reference macro blocks and applies them to the subtractor 3.

As a result, the subtractor 3 obtains a difference between the current frame macro blocks and the motion compensated reference macro blocks and outputs a predicted error. Thus, in this case the DCT circuit 4 DCT processes the prediction error. A DCT transformation coefficient based on the predicted error is quantized by the quantizer 5 and is applied to the coefficient VLCs 71 and 72.

The coefficient VLC 72 encodes the quantized outputs corresponding to all DCT transformation coefficients in variable length using the prescribed variable length code table. The output of the coefficient VLC 72 is applied to the slice layer extension data construction circuit 73 as a normal playback macro block code. The slice layer extension data construction circuit 73 generates data showing the locations of the input normal playback macro blocks on the picture frame and outputs the normal playback macro block codes as the extension data 52 of the extension bit stream region.

The output of the slice layer extension data construction circuit 73 is applied to the layer construction circuit 64 shown in FIG. 10 and the layer construction circuit 64 arranged it as the slice layer extension data 52. Further, if a decoding apparatus corresponding to this embodiment (to be described later) is not used, data of the extension data 52 cannot be decoded and a normal playback picture, that is a picture without the cut process or the mosaic process applied to a part of it or its entirety cannot be reproduced.

On the other hand, out of the quantized outputs of the coefficient VLC 72, only the outputs corresponding to the DCT transformation coefficients in the horizontal and vertical low frequency ranges shown by the hatched section in FIG. 12 are encoded in variable length using the prescribed variable length code table. Since the high frequency components of the DCT transformation coefficients have been removed from the output from the coefficient VLC 72, even when it is decoded, the minute portions of a picture cannot be reproduced and a mosaic picture will be played back. Further, the range of low frequency components to be encoded in variable length by the coefficient VLC 72 is varied according to, for instance, the broadcasting regulations of different countries. The more the range of low frequency components to be encoded in variable length is narrowed, the more the minute portions of a picture become obscure. The output of the coefficient VLC 71 is applied to the macro block layer construction circuit 18 as the special playback macro block code and also to the address VLC 15 and the encoded block pattern VLC 16.

The motion vector VLC 14 encodes the motion vector data in variable length in a block requiring the motion compensation and outputs the motion vector encoded output to the macro block layer construction circuit 18 and the address VLC 15. The address VLC 15 encodes a difference between the address of a macro block containing a coefficient and a motion vector to be encoded and the address of an encoded macro block immediately before it in variable length and outputs the encoded address output to the macro block layer construction circuit 18. The encoded block pattern VLC 16 encodes the pattern data showing a block containing a significant coefficient in variable length and outputs the encoded pattern output to the macro block layer construction circuit 18. The quantization range VLC 17 encodes the quantization range data in variable length and outputs the encoded quantization range data to the macro block layer construction circuit 18.

The macro block layer construction circuit 18 arranges the encoded outputs from VLCs 71 and 14 through 17 according to the MPEG system and outputs them as data of the normal bit stream region. The output of the macro block layer construction circuit 18 is applied to the layer construction circuit 65. The layer construction circuit 65 arranges the normal playback macro block codes for the macro blocks requiring no special playback display operation together with the special playback macro block codes.

As described above, in this embodiment it is decided whether desired portions of pictures of a normal video program software without cut and/or mosaic processes applied can be specially played back and displayed in units of macro block (macro blocks having 16 pixels×16 pixels, as shown in FIG. 1), and normal playback macro block codes and special playback macro block codes are generated for macro blocks decided that which can be specially played back and displayed, and the normal playback macro block codes are arranged in the extension bit stream region in the slice layer while the special playback macro block codes are arranged in the normal bit stream region. In the normal bit stream region, the normal picture data and the special playback data for those portions requiring the special playback display operation are arranged and it is possible to display partially cut and mosaic processed pictures.

Figure 13:
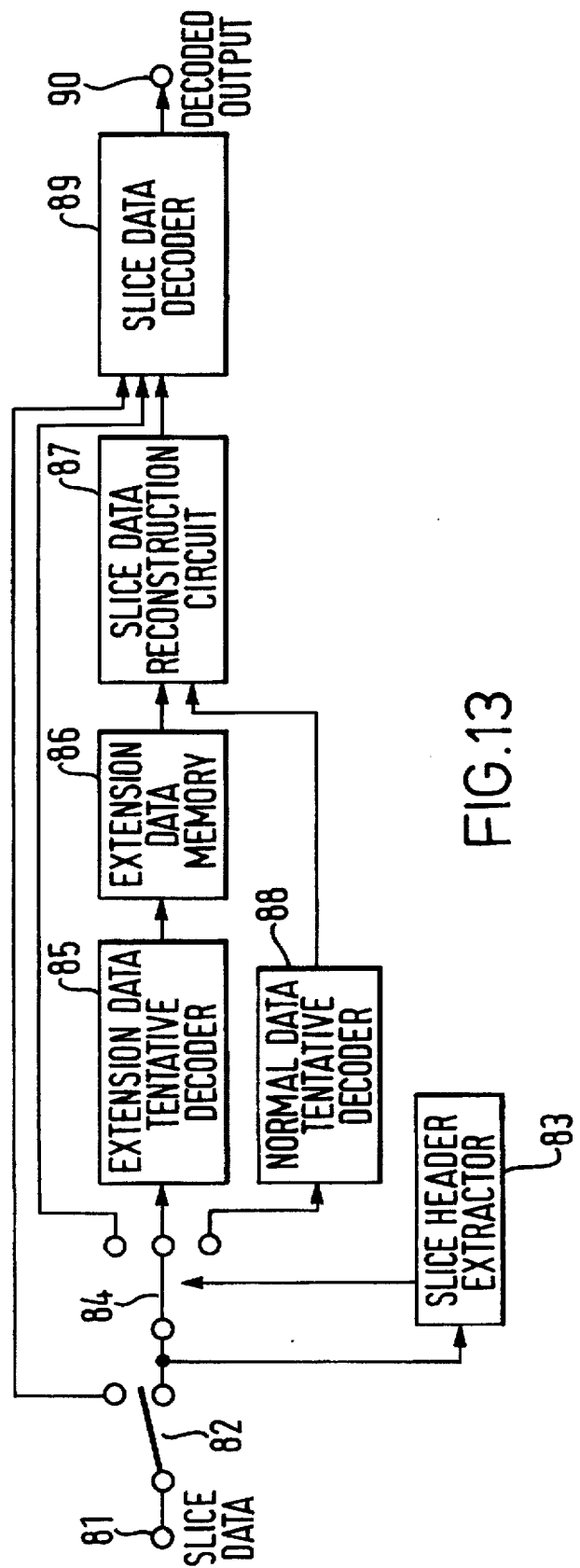
FIG. 13 is a block diagram showing one embodiment of a decoding apparatus of the present invention.

FIG. 13 is a block diagram showing one embodiment of a decoding apparatus of the present invention.

Slice data is input to an input terminal 81. This slice data is in the syntax shown in FIG. 8 and has an extension bit stream region comprising the extension data start code and extension data in addition to the normal bit stream region that can be decoded by a general decoding apparatus corresponding to the MPEG system.

The slice data is applied to a switch 82. The switch 82 is controlled by a control signal (not shown) and if data of the extension bit stream region are not decoded, the slice data is applied to a slice data decoder 89 through a switch 84 and a slice header extractor 83. The slice header extractor 83 decodes data such as a start code indicating the top of the slice, a slice address, etc. If the extension data start code is not detected following the start code, the slice header extractor 83 applies the slice data to the slice data decoder 89 by controlling the switch 84 and if the extension data start code is detected, the slice header extractor 83 outputs the extension data to an extension data tentative decoder 85 by controlling the switch 84 and then, applies macro block data to a normal data tentative decoder 88.

FIG. 14 is a block diagram showing the definite construction of the extension data tentative decoder.

Extension data from the switch 84 are input to an input terminal 91. This extension data is applied to a data reader 92. The extension data is comprised of variable length codes of macro block address and data. When a variable length code is input, the data reader 92 reads it one bit at a time, and when a fixed length code is input, the data reader 92 the prescribed number of bits at a time and outputs them to a switch 93. The switch 93 outputs the fixed length code from the data reader 92 to the extension data memory 86 and the variable length code to a variable length code table reference circuit 94. The variable length code table reference circuit 94 compares the read data with the data stored in a variable length code table 95 and detects an applicable code and if an applicable code is not detected. The circuit 94 controls the data reader 92 to read the next one bit. The variable length code table reference circuit 94 transforms variable length codes to fixed length codes by detecting the codes applicable to the input data and outputs the transformed fixed length codes to an extension data memory 86. Thus, the fixed length codes of the extension data is stored in the extension data memory 86.

When the reading of the extension data ends, a slice header extractor 83 applies macro block data to a normal data tentative decoder 88 by controlling the switch 84. The normal data tentative decoder 88 has the same structure as the extension data tentative decoder 85, and by reading macro block data, transforms them to fixed length data. Further, in this case, the normal data tentative decoder 88 outputs fixed length data directly to a slice data reconstruction circuit 87 without executing the picture extension process such as the quantization, etc.

The slice data reconstruction circuit 87 replaces the extension data from the extension data memory 86 with macro block data from the corresponding normal data tentative decoder 88 and by adding a slice header, reconstructs the slice data. Thus, the slice data reconstruction circuit 87 reconstructs the MPEG system slice layer shown in FIG. 1.

FIGS. 15(a) and 15(b) are block diagrams showing the definite construction of the slice data reconstruction circuit 87 shown in FIG. 13. FIG. 16 is an explanatory diagram for explaining its operation.

The slice data reconstruction circuit 87 has a reconstruction portion 101 shown in FIG. 15(a) and a reconstruction portion 102 shown in FIG. 15(b). The reconstruction portion 101 shown in FIG. 15{a) is used when the variable length encoding is executed only within a macro block and the reconstruction portion 102 shown in FIG. 15(b) is used when the variable length encoding is executed over multiple macro blocks.

The reconstruction portion 101 is comprised of switches 105 and 106. Macro block data from the normal data tentative decoder 88 are applied to the terminal a of the switch 106 through the terminal a of the switch 105. Extension data from the extension data memory 86 are applied to the terminal b of the switch 106. The switches 105 and 106 operate interlocking with each other based on addresses and when one of them selects the terminal a, the other also selects the terminal a and when one of them selects the terminal b, the other also selects the terminal b.

Now, when it is assumed that the macro block data shown in a square mark in FIG. 16 are input to the switch 105, the extension data shown in the hatched section in FIG. 16 correspond to the fourth and the fifth macro block data. The switches 105 and 106 select the terminal a at the timing when the first through the third macro block data is input and the macro block data is output from the switch 106. At the timing when the fourth and the fifth macro block data is input, the switches 105 to 106 select the terminal b and skip over the macro block data and select and output the extension data in its place. Thus, in place of the data arranged in the normal bit stream region, the data arranged in the extension bit stream region are arranged to reconstruct slice data.

In the reconstruction portion 102, macro block data and extension data is applied to expanders 107 and 108, respectively. If the variable length encoding process is executed over multiple macro blocks, the variable length decoding process is not executed in the extension data tentative decoder 85 and the normal data tentative decoder 88 and therefore, the expanders 107 and 108 restore the macro block data and the extension data to its original fixed length data by executing the extension process. The output of the expander 107 is applied to the terminal a of a switch 110 through the terminal a of a switch 109, and the output of the expander 108 is applied to the terminal b of a switch 110. The switches 109 and 110 operate interlockingly with each other like the switches 105 and 106.

Prescribed macro block data is replaced with extension data by the switches 109 and 110. A combiner 111 combines the outputs of the switch 110 and applies it to a reencoder 112. The reencoder 112 encodes the input data in variable length again and outputs them. Thus, in place of the data arranged in the normal bit stream region, the data arranged in the extension bit stream region are arranged to reconstruct the slice data.

Figure 4:
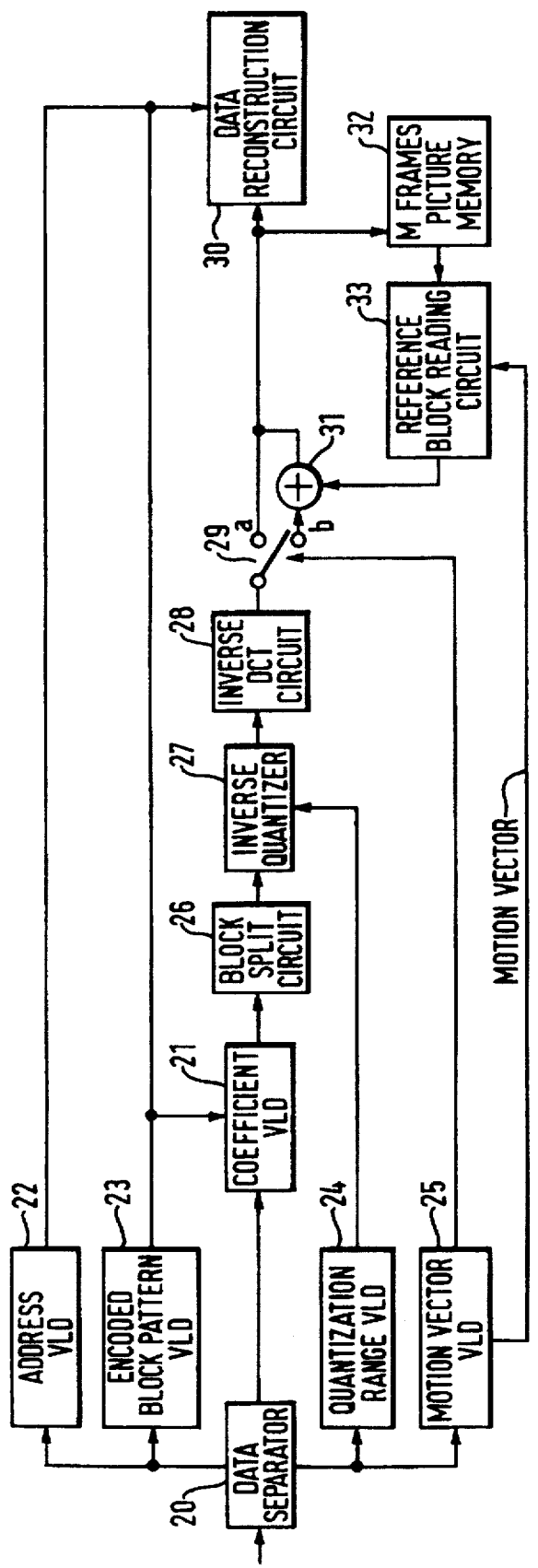
FIG. 4 is a block diagram showing a decoding apparatus corresponding to the MPEG system.

The slice data reconstruction circuit 87 reconstructs slice data by adding a slice header to the outputs of the reconstruction portions 101 and 102 and applies them to the slice data decoder 89. The slice data decoder 89 has the same structure as the decoder, as shown in FIG. 4 and encodes and outputs the input macro block data.

Figure 17:
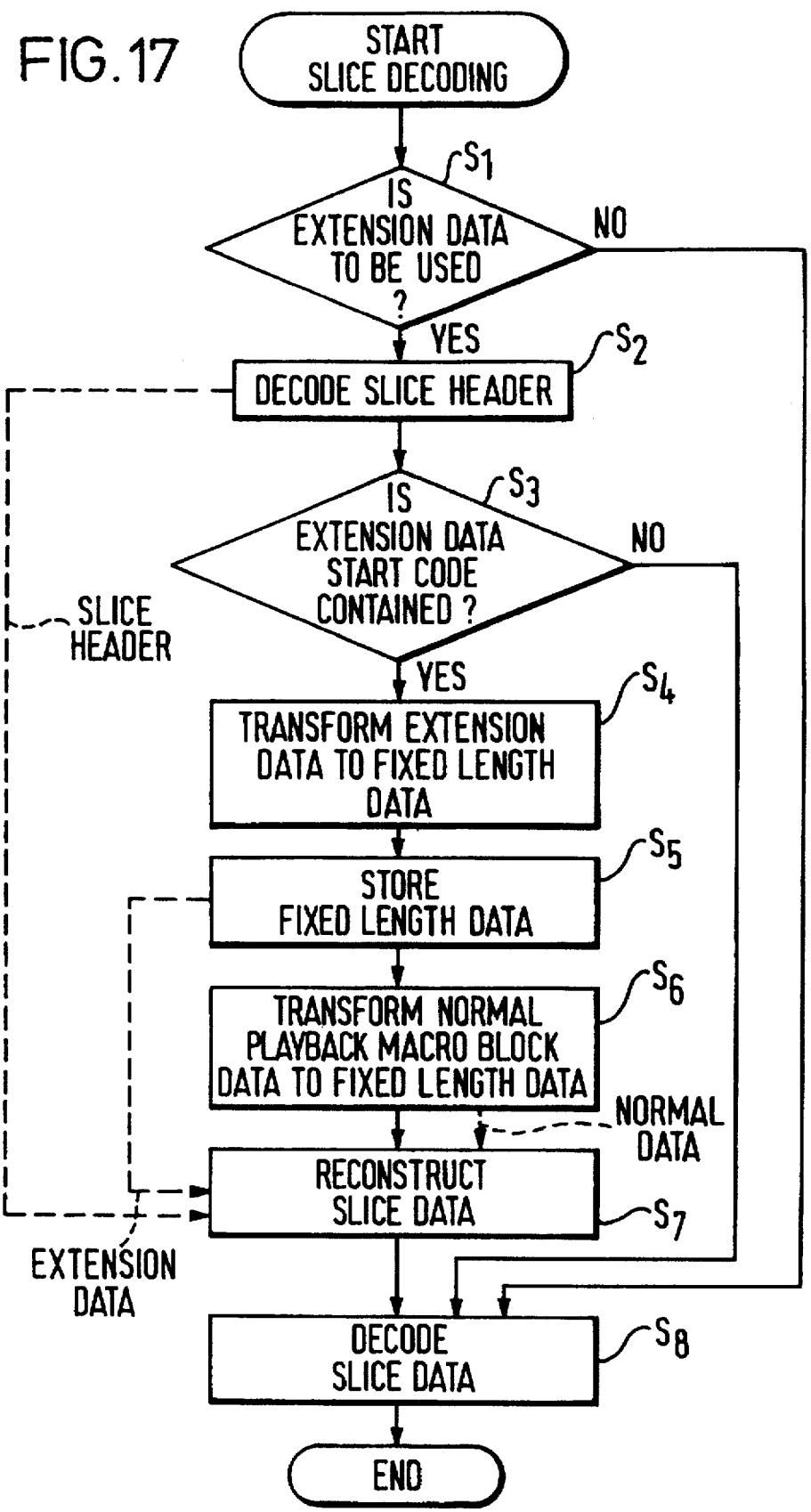
FIG. 17 is a flowchart for explaining the operation of the embodiment shown in FIG. 13.

Next, the operation of the embodiment in the construction as described above will be explained with reference to the flowchart shown in FIG. 17.

The slice data encoded by the encoding apparatus, as shown in FIG. 10, are input to an input terminal 81, as shown in FIG. 13.

When the slice layer decoding starts, it is judged whether extension data is to be used in Step S1. If extension data is not used, the process is shifted to Step S8 and the slice data input to the input terminal 81 are applied to the slice data decoder 89 for decoding through the switch 82. That is, in this case the decoding of only the macro block data 53, as shown in FIG. 8, is executed. Therefore, when the special playback macro block codes for the special playback display operation are arranged as the macro block data 53 by the encoder shown in FIG. 10, partially cut or mosaic processed pictures are displayed by the output of the slicer data decoder 89.

When playing back extension data, the process is shifted from Step S1 to Step S2 and a slice header is decoded by the slice header extractor 83. When it is detected that the extension data start code is not contained, the slice header extractor 83 outputs slice data to the slice data decoder 89 by controlling the switch 84 (Step S3). In this case, it means that the extension data is not contained in the input slice layer and a macro block requiring the special playback display operation does not exist in this slice layer. That is, all macro block data are comprised of normal playback macro block codes sequentially arranged. Therefore, when the decoding process is executed by the slice data decoder 89 in Step S8. a normal picture without the cut process or a mosaic process applied is displayed.

On the other hand, when the extension data start code is contained, the slice header extractor 83 applies extension data to the extension data tentative decoder 85 by controlling the switch 84. The extension data comprising a normal playback macro block code and an address are transformed to fixed length data by the extension data tentative decoder 85 in Step S4 and stored in the extension data memory 86 in Step S5.

When the extension data reading ends, the slice header extractor 83 applies macro block data to the normal data tentative decoder 88 by controlling the switch 84. In Step S6, the normal data tentative decoder 88 transforms normal playback macro block data comprising the macro block data 53 and a special playback macro block code to fixed length codes and outputs them to the slice data reconstruction circuit 87.

The slice data reconstruction circuit 87 reads the extension data from the extension data memory 86 and replaces them with the data from the normal data tentative decoder 88 and outputs them (Step S7). That is, the slice data reconstruction circuit 87 arranges normal playback macro block codes in place of special playback macro block codes. The slice data decoder 89 decodes the output data of the slice data reconstruction circuit 87 in Step S8. Macro block data is comprised by replacing the special playback macro block codes, and this with the normal playback macro block codes and the original video without the cut process and the mosaic process applied can be displayed by the slice data reconstruction circuit 87.

As described above, in this embodiment it is possible to arrange normal playback macro block codes contained in the extension data in place of the special playback macro block codes contained in the macro block data in the syntax of the slice layer shown in FIG. 8 and transform them in a syntax corresponding to the MPEG system. If macro block data is directly decoded, it is possible to display pictures partially or entirely cut or mosaic processed, and if the extension data is decoded by partially changing them, it is possible to display original pictures without the cut or mosaic process applied.

Further, if normal playback macro block codes are arranged as the macro block data requiring the special playback display operation and special playback macro block codes are arranged in the extension data, it is possible to display pictures without the cut or mosaic process applied by directly decoding the macro block data, and when they are arranged in place of data of the extension data, it is possible to display cut or mosaic processed pictures.

Figure 18:
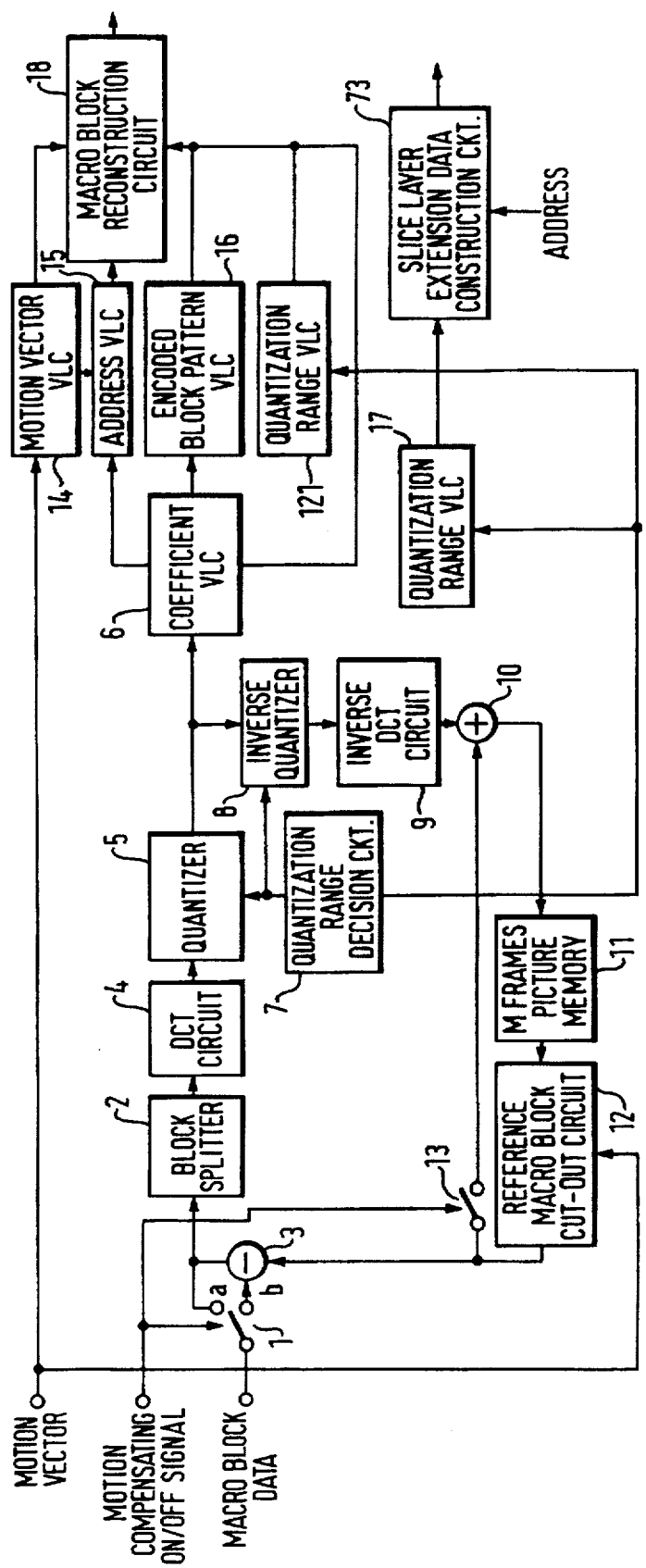
FIG. 18 is a block diagram showing another embodiment of the present invention.

FIG. 18 is a block diagram showing another embodiment of the present invention. In FIG. 18, the same reference numerals are used to designate the same component elements as in FIG. 11 and their explanations are omitted. Further, in FIG. 18, the embodiment will be explained by assuming that special playback macro block codes are arranged in the normal bit stream region and normal playback macro block codes are arranged in the extension bit stream region.

This embodiment differs from the embodiment shown in FIG. 11 in that in this embodiment, the coefficient VLC 6 is used for the coefficient VLC 71, a quantization range VLC 121 is used for the quantization range VLC 17, and the quantization range VLC 17 is used for the coefficient VLC 72. The coefficient VLC 6 encodes the quantized output corresponding to the significant DCT transformation coefficients in all frequency bands in variable length using the prescribed variable length code table and outputs them to the address VLC 15 and the encoded block pattern VLC 16.

In this embodiment, the quantization range VLC 121 executes the variable length encoding process by setting a quantization range for the special playback differing from the quantization range used in the quantizer 5. The encoded special playback quantization range data output from the quantization range VLC 121 is applied to the macro block layer construction circuit 18. The macro block layer construction circuit 18 rearranges the encoded outputs of VLCs 6, 14 through 16 and 121 to construct the macro block layer.

The quantization range VLC 17 encodes the actual quantization range data decided by the quantization range decision circuit 7 in variable length using the prescribed variable length code table and outputs it to the slice layer extension data construction circuit 73. The slice layer extension data construction circuit 73 arranges the output of the quantization range VLC 17 in the extension bit stream region as the encoded normal display quantization range data output for the extension data.

In the embodiment described above, as to macro blocks requiring the special playback display operation, the quantization range VLC 121 outputs a quantization range data differing from an actual quantization range data as the encoded quantization range data output for the special playback. For instance, when assuming that if a quantization range for the special playback is set at a range sufficiently wider than an actually used quantization range, the DCT transformation coefficients in the horizontal and vertical high frequency ranges become nearly zero when the inverse quantization process is executed at the decoding side using this quantization range for the special playback, and like the embodiment shown in FIG. 11 a mosaic processed picture is obtained. The encoded output of the quantization range data for special playback from the quantization range VLC 121 is arranged in the macro block data in the normal bit stream region by the macro block layer construction circuit 18.

The quantization range VLC 17 encodes the quantization range data used in the encoding in the embodiment in variable length and outputs it. The slice layer extension data construction circuit 73 arranges the input encoded quantization range data output in the extension data in the extension bit stream region.

Other functions and effects are the same as the embodiment shown in FIG. 11.

Further, it is possible to execute, for instance, the special playback process adapting to regulations in various countries when the setting of the quantization range of the quantization range VLC 121 is changed.

Figure 19:
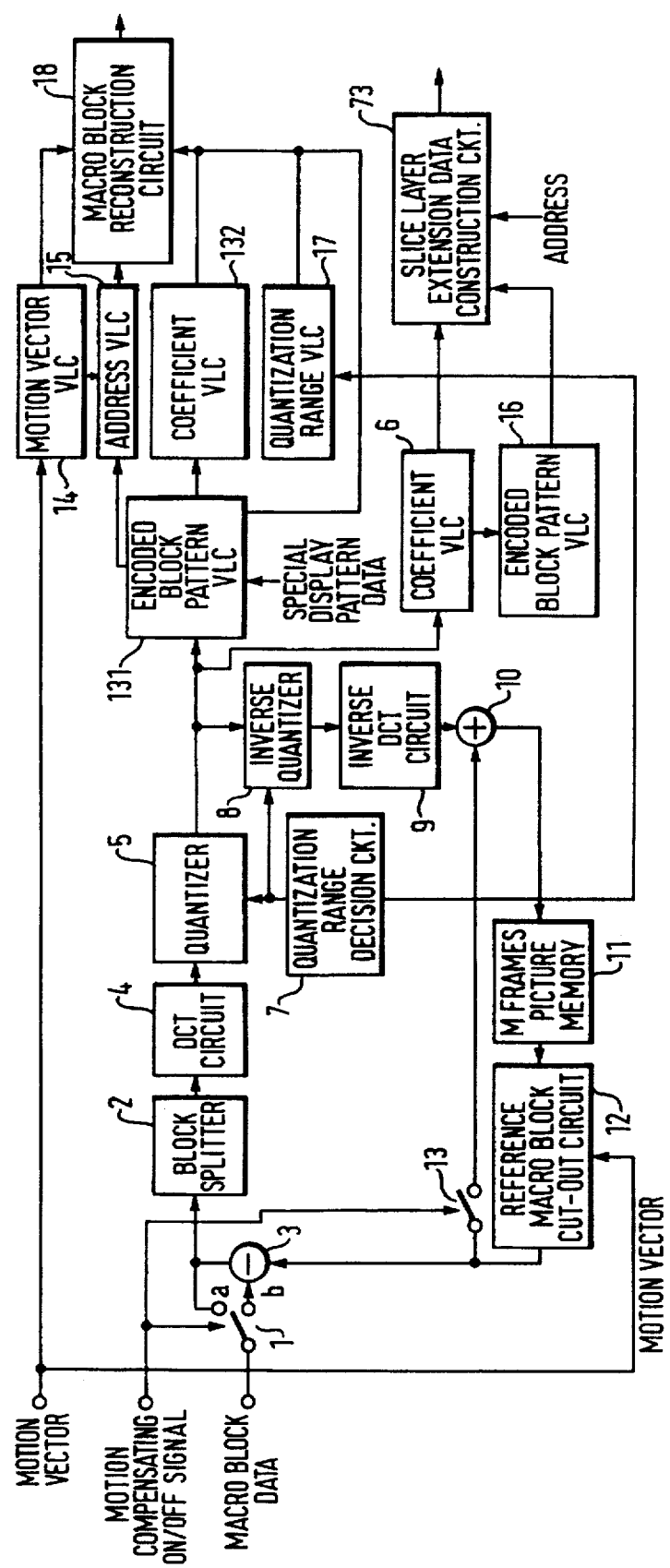
FIG. 19 is a block diagram showing an additional embodiment of the present invention.

FIG. 19 is a block diagram showing an additional embodiment of the present invention. In this embodiment it is possible to select whether the special playback display operation can be made in units of blocks. In FIG. 19, the reference numerals are used to designate the same component elements as in FIG. 11 for simplicity of the explanation. Further, in FIG. 19 it is assumed that special display macro block codes are arranged in the normal bit stream region while normal playback macro block codes are arranged in the extension bit stream region.

The output of the quantizer 5 is applied to the coefficient VLC 6. The coefficient VLC 6 encodes the quantized outputs corresponding to significant DCT transformation coefficients in all frequency bands in variable length using the prescribed variable length code table and outputs them to the encoded block pattern VLC 16. In this embodiment the outputs of the coefficient VLC 6 and the encoded block pattern VLC 16 are applied to the slice layer extension data construction circuit 73.

The output of the quantizer 5 is applied to an encoded block pattern VLC 131. The encoded block pattern VLC 131 is also applied with special display pattern data showing blocks which make the special playback display operation possible. This special display pattern data show which blocks out of those comprising macro blocks (six blocks in the example shown in FIG. 1) can be specially played back and displayed. The encoded block pattern VLC 131 outputs the pattern data showing the presence of blocks which are not played back and displayed out of the quantized outputs of blocks containing significant DCT transformation coefficients to the address VLC 15, the macro block layer construction circuit 18 and a coefficient VLC 132.

The coefficient VLC 132 encodes only the quantized outputs of blocks shown by the pattern data from the encoded block pattern VLC 131 out of the quantized outputs from the quantizer 5 in variable length and outputs them to the macro block layer construction circuit 18.

Next, the operation of the embodiment in the construction as described above will be explained with reference to the explanatory diagram shown in FIG. 20.

Now, it is assumed that a macro block is comprised of four luminance blocks Y and one each of color difference blocks Cr and Cb as shown in FIG. 20 and each block is assigned with numbers of 1 through 6 as shown in FIG. 20. It is further assumed that out of these blocks, the block numbers of those blocks containing significant DCT transformation coefficients are 1, 2, 3, 5 and 6 and the special display pattern data to be input to the encoded block pattern VLC 131 indicate Blocks 2 and 4.

Macro block data containing the blocks (Blocks 2 and 4) requiring the special playback display operation are input through the switch 1. The quantized outputs from the quantizer 5 are all encoded in variable length by the coefficient VLC 6 and are applied to the slice layer extension data construction circuit 73. The encoded block pattern VLC 16 outputs the pattern data showing the presence of blocks containing significant DCT transformation coefficients to the slice layer extension data construction circuit 73 based on the output of the coefficient VLC 6. In this case, the pattern data from the encoded block pattern VLC 16 become "111011" denoting Block No. 1, 2, 3, 5 and 6. The slice layer extension data construction circuit 73 arranges the outputs of the significant coefficient VLC 6 as the extension data of the extension bit stream region.

On the other hand, the output of the quantizer 5 is also applied to the encoded block pattern VLC 131. The encoded block pattern VLC 131 outputs the pattern data "101011" denoting the presence of blocks requiring no special playback display operation out of those containing significant DCT transformation coefficients, that is, Block No. 1, 3, 5 and 6.

The coefficient VLC 132 encodes only the quantized outputs for the blocks of Block No. 1, 3, 5 and 6 in variable length based on the pattern data from the encoded block pattern VLC 131 and outputs them to the macro block layer construction circuit 18. The macro block layer construction circuit 18 rearranges the encoded outputs from VLCs 14, 15, 17, 131 and 132 as the macro block data of the normal bit stream region. Thus, when the normal bit stream region is played back and decoded, the playback of blocks designated by the special display pattern data can be cut.

Other functions and effects are the same as those in the embodiment shown in FIG. 11.

Further, it is apparent that the decoding apparatus in the embodiment shown in FIG. 13 is compatible with the decoding process in units of blocks.

Hereinafter, still other preferred embodiments according to some other aspect of the present invention will be described hereinafter with reference to the attached drawings, FIGS. 21 through 30.

Figure 5:
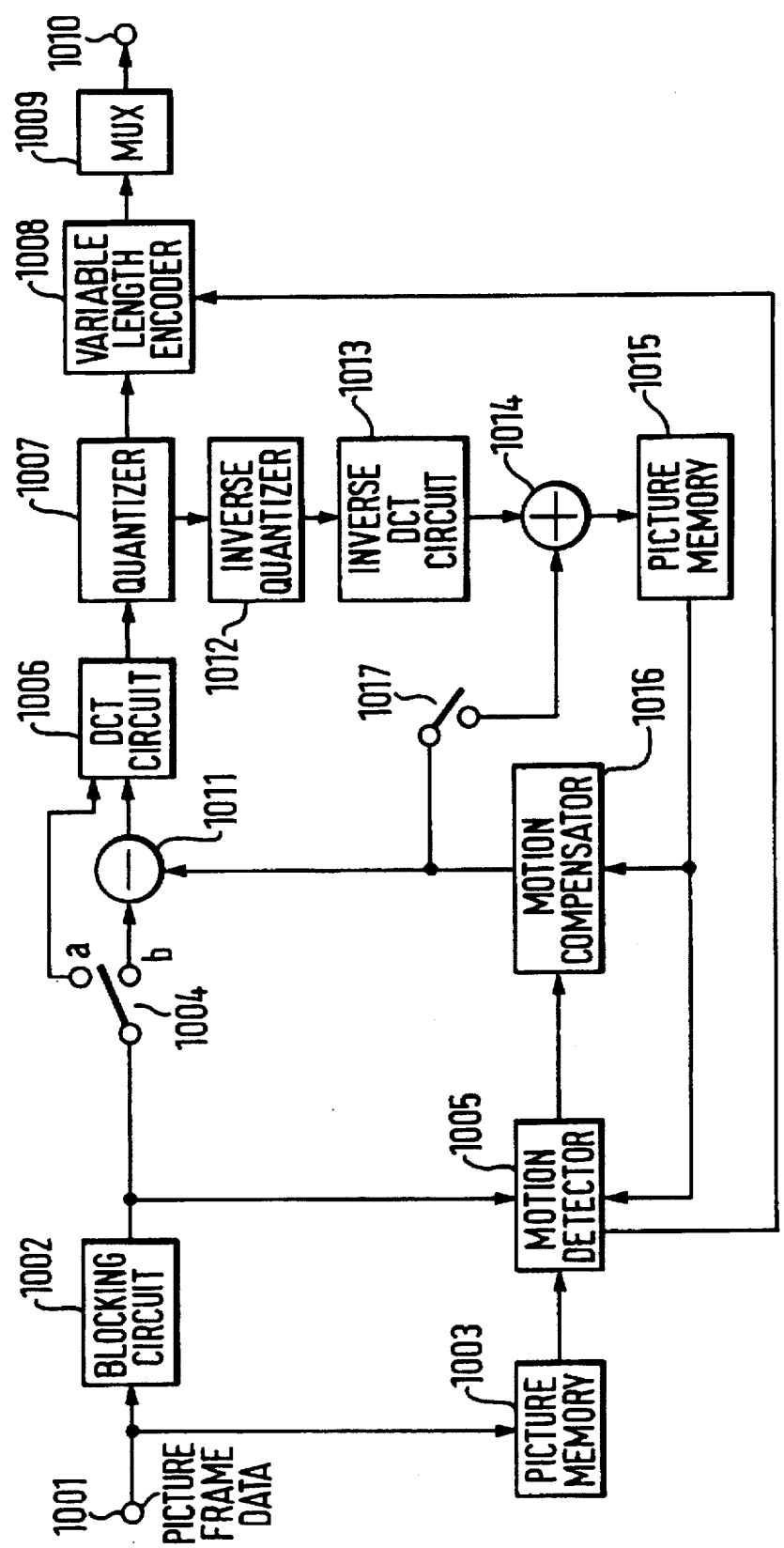
FIG. 5 is a block diagram showing a conventional video data encoding apparatus.
Figure 6A:
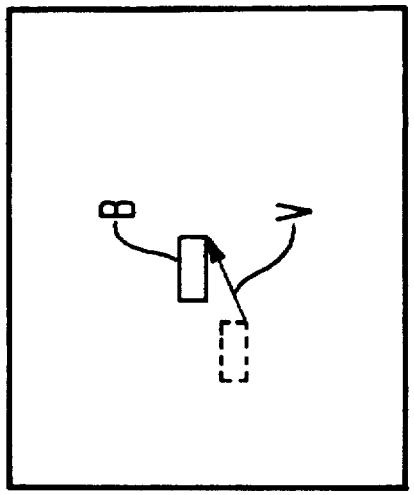
FIGS. 6(a) and 6(b) are explanatory diagrams for explaining the operation of a conventional apparatus.
Figure 6B:
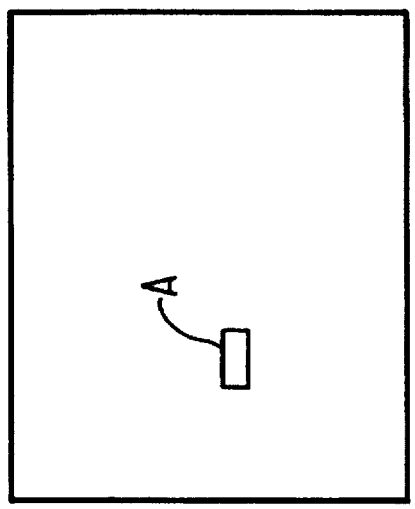
Figure 21:
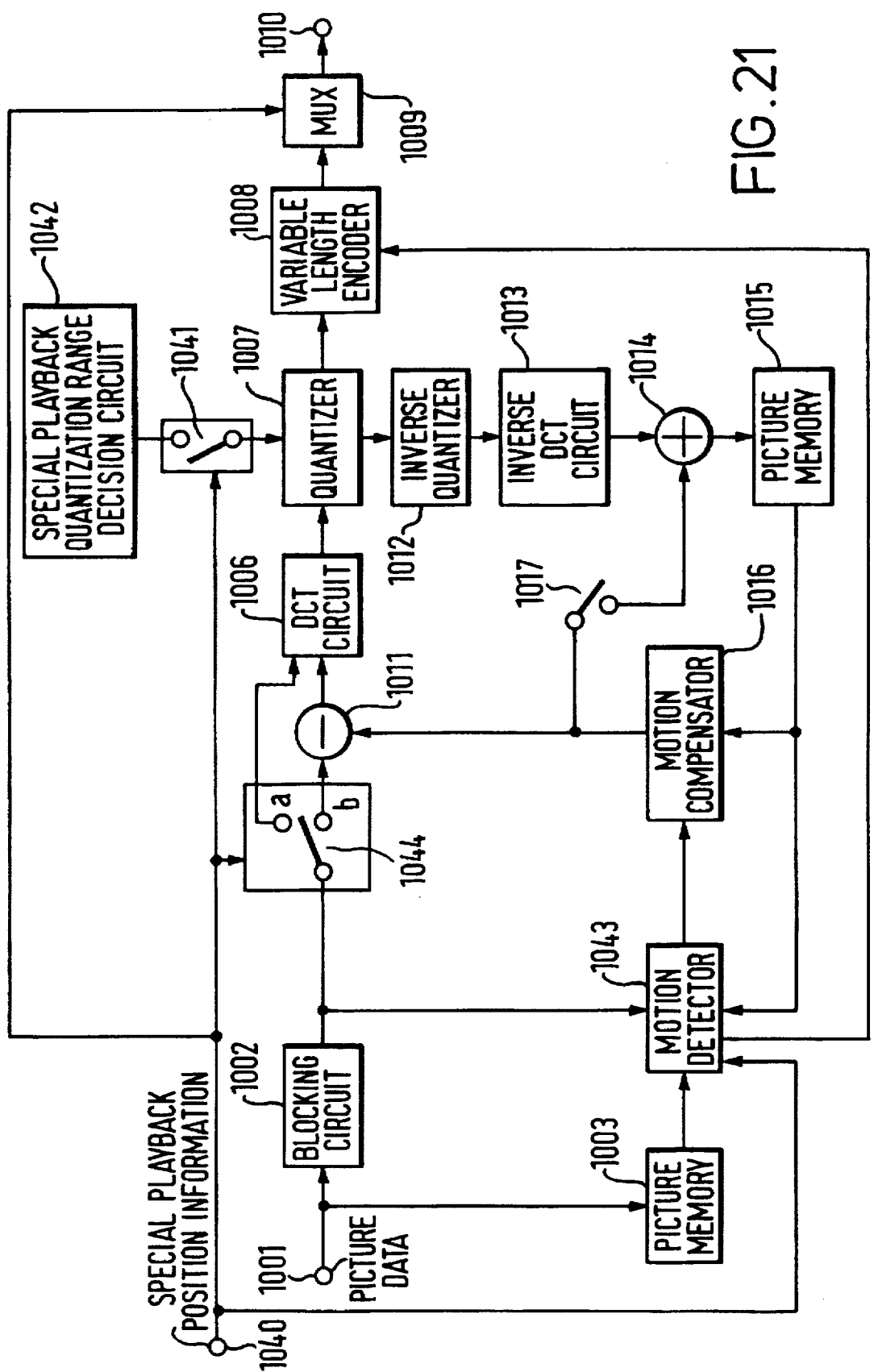
FIG. 21 is a block diagram showing one embodiment of the video data encoding apparatus of the present invention.

FIG. 21 is a block diagram showing one embodiment of a video data encoding apparatus of the present invention. In FIG. 21, the same reference numerals are used to designate the same component elements as in FIG. 5.

In this embodiment, information on special playback location is input through a terminal 1040. The information on special playback location is an formation showing, for instance, a location of a block to be specially played back, e.g., mosaic display, etc. Based on this information on special playback location, the encoded output for normal playback or for special playback such as the mosaic display, etc. is generated and output.

Picture frame data is input to the input terminal 1001. This picture frame data is framed by applying picture signals to a frame memory and reading them out. The picture frame data is applied to the blocking circuit 1002. The blocking circuit 1002 divides the picture frame data into horizontal m pixels×vertical n line blocks and outputs the divided blocks to a motion detector 1043 and a switch 1044.

The switch 1044 selects the terminal a when performing the intra-frame encoding and applies block data to the DCT circuit 1006, and its selects the terminal b when performing the inter-frame encoding and applies block data to the subtractor 1011. The subtractor 1011 is applied with motion compensated reference block data from a motion compensator 1016 (described later), by subtracting the reference block data from the current frame block data, outputs a prediction error to the DCT circuit 1006.

Further, the switching of the switch 1044 may be decided in advance based on an encoding system or a size of correlation between the reference block data from the motion compensated circuit 16 (described later) and the block data from the blocking circuit 1002. Further, in this embodiment, the switch 1044 selects the terminal a when a prescribed block is a special playback block and this block is encoded immediately after it is first designated to be a special playback block.

The DCT circuit 1006 is applied with block data and by transforming spatial coordinate components into frequency components through the DCT process, outputs the frequency components to the quantizer 1007. Further, instead of the DCT circuit 1006, a DST (Digital Sine Transformation) circuit, a FFT (Fast Fourier Transformation) circuit, WHT (Fast Walsh-Hadamard) circuit, FH (Fast Haar) transformation circuit, FS (Fast Slant) transformation circuit or KLT (Fast Karhunen-Loeve) transformation circuit, etc. may be used.

The quantizer 1007 quantizes DCT transformation coefficients and outputs them to the variable length encoder 1008 and the inverse quantizer 1012. In this embodiment, the quantization range of the quantizer 1007 is varied for blocks designated for normal playback and blocks designated for special playback. A special playback quantization range decision circuit 1042 outputs a quantization range data for special playback blocks to the quantizer 1007 through the switch 1041. The ON/OFF of the switch 1041 is controlled by the information on special playback location and outputs a quantization range data for special playback to the quantizer 1007 when quantizing special playback blocks. That is, the quantizer 1007 carries out the quantization based on the quantization range decided by the used code quantity (generated coded quantity) and set code quantity, etc. for normal playback blocks and a special playback quantization range for special playback blocks. The quantization range for special playback is extremely large and the majority of transformation coefficient power is not transmitted.

The inverse quantizer 1012 inverse quantizes a quantized output using the quantization range data and outputs the inversely quantized output to the inverse DCT circuit 1013 in order to generate a reference block. The inverse DCT circuit 1013 inverse DCT processes the inversely quantized output and outputs to the adder 1014. Further, if other transforming circuits are used instead of the DCT circuit 1006, an inverse transforming circuit corresponding to this transforming circuit is adopted.

The adder 1014 plays back the current frame data by adding up the reference frame data from a switch 1017 (described later) and the current frame decoded output and outputs the current frame data to a picture memory 1015. Further, for the intra-frame encoded blocks, the switch 1017 is OFF and the adder 1014 does not perform the adding process. The picture memory 1015 delays the output (local decoded data) of the adder 1014 by, for instance, one frame period and outputs it to the motion compensator 1016 as the reference frame data.

On the other hand, to detect the motion of a picture, the input picture frame data from the input terminal 1001 is also applied to the picture memory 1003. The picture memory 1003 outputs the picture frame data to the motion detector 1043 by delaying it by, for instance, one frame period. The motion detector 1043 obtains the motion between the current frame block data from the blocking circuit 1002 and, for instance, one frame preceding block data from the picture memory 1003 and outputs a motion vector to the motion compensator 1016 and the variable length encoder 1008. Further, the motion detector 1013 may obtain a motion vector between the output of the picture memory 1015 and the output of the blocking circuit 1002.

A motion vector from the motion detector 1043 is applied to the motion compensator 1016. The motion compensator 1016 corrects the blocking location of the reference frame block using the motion vector and generating a motion compensated reference block and outputs it to the subtractor 1011 and also to the adder 1014 through the switch 1017. The switch 1017 is turned ON only when carrying out the inter-frame encoding.

FIGS. 22(a) and 22(b) are explanatory diagrams for explaining the motion detecting method of the motion detector 1043 shown in FIG. 21.

The motion detector 1043 sets a search range in a reference picture for motion detection using, for instance, a one frame preceding picture from the picture frame memory 1003 or 15. That is, when obtaining a motion vector of a prescribed encoded block of the current frame, the motion detector 1043 sets a search range of a prescribed range containing a block of which the relative location is the same as an encoded block in the reference picture. The motion detector 1043 carries out the matching calculation of each pixel of an encoded block and pixel in the search range at the corresponding location by shifting the encoded block in units of pixels in the search range. From the result of the matching calculation, the motion detector 1043 specifies the location of the encoded block in the preceding frame and obtains a vector indicating the relation of the position of this block with the location of the encoded block as a motion vector.

In this embodiment, if a block encoded as a special playback block is contained in the search range, the motion detector 1043 excludes a range of 2m×2n centering around this special playback block (hereinafter referred to as the exclusion range) from the search range.

Now, it is assumed that, for instance, a block T of the reference picture 1047 shown in FIG. 22(a) is a special playback block and this block T is moved to the location of a block B shown in FIG. 22(b) in the current frame picture 48. When the encoded block B is encoded by the inter-frame prediction encoding, the motion detector 1043 sets a search range by excluding the reference picture exclusion range H. The motion detector 1043 obtains a motion vector by executing a matching calculation between blocks in the search range excluding the encoded block B and the range H. The motion compensator 1016 decides the blocking location of a reference picture from the picture memory 1015 based on the motion vector from the motion detector 1043. In this case, therefore, any block in the exclusion range H of the reference picture 1047 is not output as a reference block from the motion compensator 1016.

The motion compensated reference block data from the motion compensator 1016 is applied to the subtracter 1011.

When the switch 1044 has selected the terminal b, the subtracter 1011 is also applied with the current frame block data and by subtracting the reference block data from the current frame block data, the subtracter 1011 outputs a prediction error to the DCT circuit 1006. In this case, the DCT circuit 1006 DCT processes the prediction error and outputs a transformation coefficient.

The quantized output from the quantizer 1007 and the motion vector from the motion detector 1043 are applied to the variable length encoder 1008. The variable length encoder 1008 encodes the quantized output according to the prescribed variable length code table and encodes the motion vector according to the prescribed variable length code table and outputs them to the MUX 1009. The MUX 1009 outputs the output of the variable length encoder 1008 as the encoded output through the output terminal 1010 by multiplexing header data such as address, etc. and information on special playback locations.

Next, the operation of the embodiment in the construction as described above will be explained.

The picture frame data input through the switch 1 is applied to the blocking circuit 1002 where it is blocked. In the intra-frame encoding mode, the switch 1004 has selected the terminal a and block data is input to the DCT circuit 1006 through the switch 1004. The block data is DCT processed by the DCT circuit 1006 and a DCT transformation coefficient is applied to the quantizer 1007 for quantization. This quantized output is encoded in variable length in the variable length encoder 1008.

In the inter-frame encoding mode, the quantized output is also applied to the inverse quantizer 1012 for inverse quantization and is restored to the original data through the inverse DCT process in the inverse DCT circuit 1013. This data is differential information and the adder 1014 plays back the current frame data by adding the output from the inverse DCT circuit 1013 with the reference block data from the switch 1017. The local decoded data from the adder 1014 is applied to the picture memory 1015 for delaying by, for instance, one frame and the reference frame is applied to the motion compensator 1016.

On the other hand, from the picture memory 1003 or 15, for instance, one frame preceding reference picture data is applied to the motion detector 1043. The motion detector 1043 sets a search range in the reference picture and obtains a motion vector by carrying out a matching calculation in this search range.

The motion compensator 1016 decides the blocking location of the reference picture from the picture memory 1015 based on the motion vector and outputs a m×n reference block data to the subtractor 1011. In this case, the switch 1044 has selected the terminal b and the subtractor 1011 obtains a prediction error by subtracting a reference block data from the current frame block data and outputs it to the DCT circuit 1006. The prediction error is DCT processed in the DCT circuit 1006, and after the prediction error is quantized by the quantizer 1007, it is applied to the variable length encoder 1008.

Now, it is assumed that a prescribed block is to be displayed, for instance, in mosaic. If the information on a special playback location from the terminal 1040 indicates that this special playback block has been input, the switch 1041 is turned ON and a quantization range for special playback from the special playback quantization range decision circuit 1042 is output to the quantizer 1007. This makes the quantization range in the quantizer 1007 extremely wide.

Immediately after a prescribed block is designated to be a special playback block, the switch 1044 selects the terminal a. As a result, the block data of the special playback block from the blocking circuit 1002 is directly supplied to the DCT circuit 1006. That is, the intra-frame encoding is carried out in this case. A DCT transformation coefficient is applied to the quantizer 1007 and is quantized. In this case, since the quantization range is extremely wide, the majority of the DCT transformation coefficient is not transmitted. The quantized output of the quantizer 1007 is encoded in variable length and output with a header such as address, etc. added in the MUX 1009.

When the encoded output of this special playback block is played back, for instance, a mosaic display corresponding to the quantization range for special playback is made.

On the other hand, the quantized output of the special playback block is inversely quantized by the inverse quantizer 1012 and, after inverse DCT processing by the inverse DCT circuit 1013, is supplied to the adder 1014. The adder 1014 is applied with block data corresponding to the preceding frame through the switch 1017 and plays back the current frame data through the adding process. The played back local decoded data is stored in the picture memory 1015.

In the next frame encoding, block data of the current block corresponding to the special playback block of the preceding frame is supplied to the subtractor 1011 through the terminal b of the switch 1044. A reference picture of the preceding frame is supplied to the motion detector 1043 from the picture memory 1003 and the motion detector 1043 obtains a motion vector between the reference picture and the current frame picture. In this embodiment, if a special playback block is contained in the search range, an exclusion range of 2m×2n centering around this block is excluded from the search range and a motion vector is obtained. That is, when the data of the current frame block B corresponding to the special playback block T of the preceding frame shown in FIG. 22(a) is input to the motion detector 1043, the motion detector 1043 excludes the 2m×2n exclusion range H containing the special playback block T of the preceding frame from the search range. Therefore, the motion detector 1043 outputs a motion vector obtained between blocks excluding this exclusion range H.

The reference picture of the preceding frame has been input to the motion compensator 1016 from the picture memory and the motion compensator 1016 decides the blocking location of the reference block based on a motion vector. In this case, the motion vector indicates a blocking location other than the 2m×2n exclusion range containing the special playback block and block data in this exclusion range H is never output as a reference block. Reference block data from the motion compensator 1016 is supplied to the subtractor 1011. The subtractor 1011 obtains a prediction error by subtracting the reference block data from the data of the encoded block B and outputs this prediction error to the DCT circuit 1006. The output of the DCT circuit 1006 is quantized in the quantizer 1007 using the extremely wide quantization range.

Thereafter, the same operation is repeated. If block data corresponding to a block in the exclusion range H is output as reference block data, a prediction error becomes a value near zero (0) as the reference block data is nearly the same data as encoded block data, and even when the quantization range is set to an extremely wide range, nearly the same playback as that in the normal playback is carried out by the encoded output up to the preceding frame and the effective special playback display operation is not carried out.

However, in this embodiment, block data corresponding to a block in the exclusion range H is never used as the reference block data and a prediction error becomes a relatively large value. This prediction error is quantized in the quantizer 1007 using the extremely wide quantization range after the DCT process is carried out. That is, the power of a prediction error required for reproduction of a picture is sharply lost as a result of the quantization and the effective special playback display operation is carried out.

The output of the quantizer 1007 is encoded in variable length by the variable length encoder 1008. The variable length encoder 1008 also encodes a motion vector in variable length. The MUX 1009 outputs the output of the variable length encoder 1008 with a header, information on special playback location, etc. added.

When playing back a special playback block, an intra-frame encoded special playback block is first played back and an original picture is reproduced by adding a prediction error to this playback output. In this case, since the power of the prediction error is relatively large, a sufficient mosaic effect is obtained.

Thus, in this embodiment, the prescribed exclusion range containing a special playback block is excluded from the reference picture search range when detecting a motion vector for executing the motion compensation in the inter-frame encoding mode so that block data corresponding to the block contained in this exclusion range is not supplied to the subtractor as a reference block data. Therefore, the prediction error becomes relatively large and it becomes possible to generate the effective encoded output for special playback display operation such as a mosaic display, etc. Further, the exclusion range can be set in any size as desired.

Figure 23:
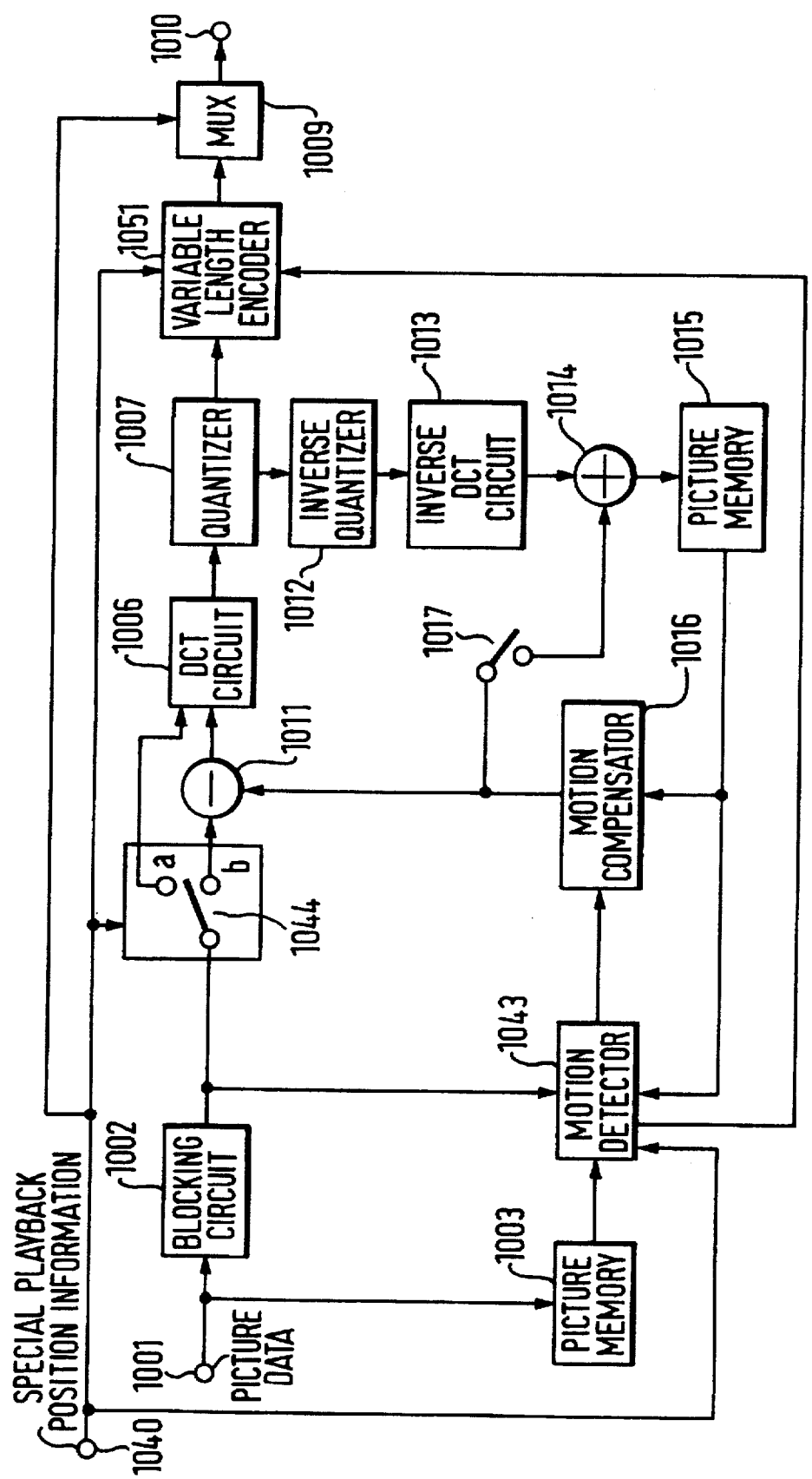
FIG. 23 is a block diagram showing another embodiment of the present invention.

FIG. 23 is a block diagram showing another embodiment of the present invention. The same reference numerals are used to designate the same component elements as in FIG. 21 and the explanation of theses elements is omitted.

This embodiment differs from the embodiment shown in FIG. 21 in that the special playback quantization range decision circuit 1042 and the switch 1041 shown in FIG. 21 were eliminated and the variable length encoder 1051 has been adopted instead of the variable length encoder 1008. The quantizer 1007 quantizes both normal playback blocks and special playback blocks using a quantization range based on the amount of generated codes, the amount of assigned set codes, etc. The variable length encoder 1051 encodes the quantized output from the quantizer 1007 using the prescribed variable length code table and also, encodes a motion vector from the motion detector 1043 using the prescribed variable length code table and outputs them to the MUX 1009.

In this embodiment, information on special playback locations is applied to the variable length encoder 1051, which encodes only a part of the quantized output in variable length for special playback blocks.

FIG. 24 is an explanatory diagram for explaining the variable length code table of the variable length encoder 1051 in FIG. 21. FIG. 24 shows the state of the horizontal m pieces×vertical n pieces of quantized outputs sequentially arranged from the horizontal and vertical low frequency range toward the high frequency range.

The quantizer 1007 outputs the quantized outputs sequentially while scanning in zigzags from the horizontal and vertical low frequency range toward the high frequency range. The horizontal and vertical high frequency range side of the quantized outputs, that is, the lower right side, is corresponds to more detailed patterns, and the special playback display operation such as the mosaic display, etc. becomes possible when the quantized outputs of this portion are not transmitted. For this reason, in this embodiment, the variable length encoder 1051 encodes and outputs the hatched section of FIG. 24, that is, only the horizontal and vertical low frequency side quantized outputs, in variable length.

In the embodiment in the construction as described above, if a special playback block is contained in the motion detecting search range, a 2m×2n exclusion range including this block is excluded from the search range. As a result, in the inter-frame encoding of special playback blocks, the quantized output of sufficient power is output from the quantizer 1007. The variable length encoder 1051 encodes only the low frequency range quantized output in variable length for special playback blocks. Thus, even in inter-frame encoding, the power of the encoded output of special playback blocks is sufficiently lowered and the effective mosaic display becomes possible.

Other operations and effects are the same as the embodiment in FIG. 21.

Figure 25:
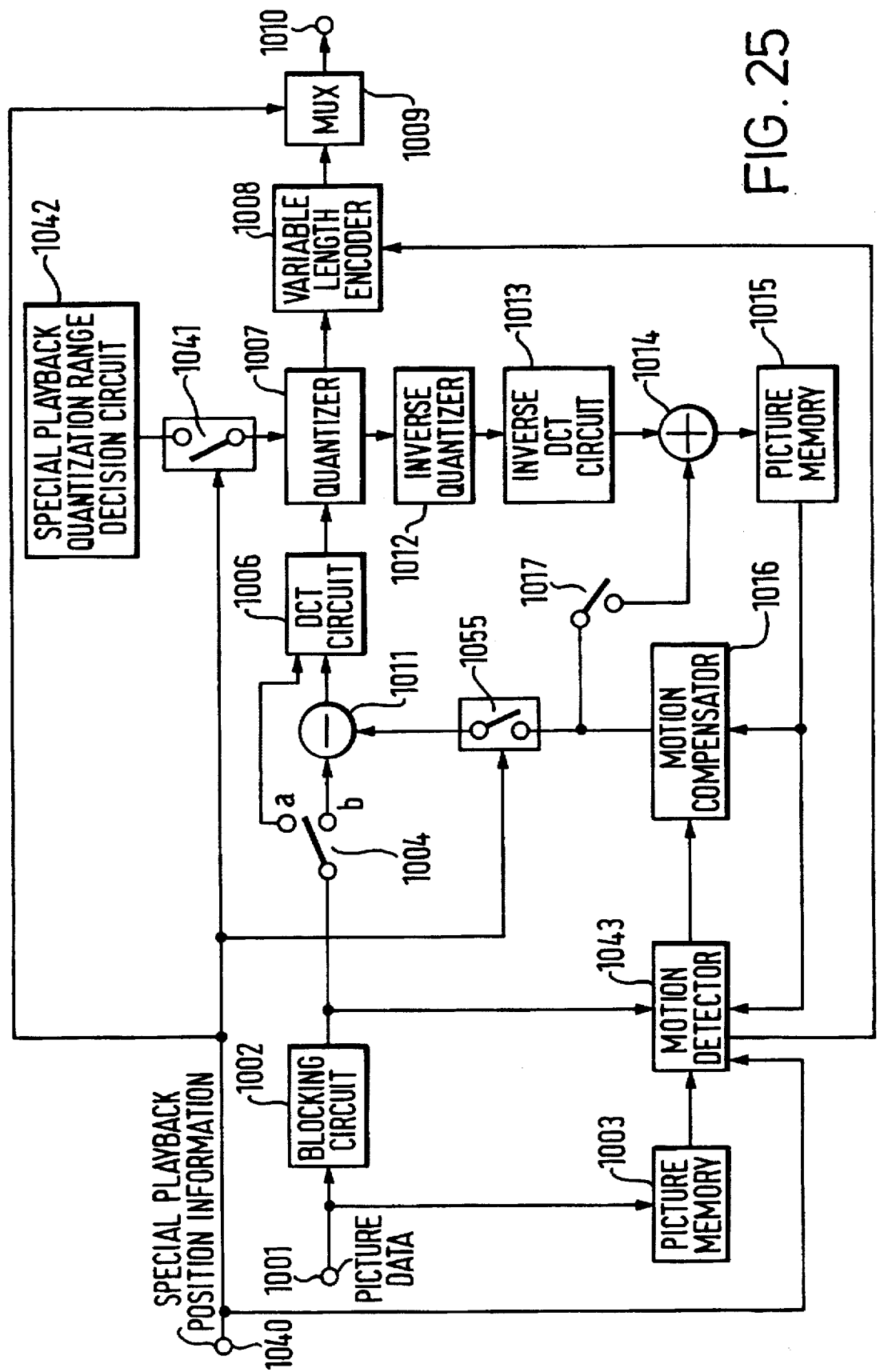
FIG. 25 is a block diagram showing another embodiment of the present invention.

FIG. 25 is a block diagram showing another embodiment of the present invention. In FIG. 25, the same reference numerals are used to designate the same component elements as in FIG. 21 and the explanation is omitted.

This embodiment differs from the embodiment shown in FIG. 21 in that the motion compensated reference block data is supplied to the subtractor 1011 from the motion compensator 1016 through a switch 1065, and the switch 1004 has been adopted instead of the switch 1044.

The switch 1004 selects the terminal a in the intra-frame encoding mode and the terminal b in the inter-frame encoding mode. The switch 1055 is turned OFF in the intra-frame encoding mode and is turned ON in the inter-frame encoding mode. Further, the switch 1055 is controlled by the information on special playback location from the terminal 1040 and is turned OFF when an encoded block is a special playback block, and this block is encoded immediately after it is first designated to be a special playback block. Further, the switch 1055 may be designed so that it is turned OFF when it is indicated that an encoded block is a special playback block. When the switch 1055 is OFF, zero (0) is supplied to the subtractor 1011 and block data from the switch 1004 is supplied directly to the DCT circuit 1006.

In the embodiment in the construction as described above, when generating an encoded output for normal playback, the switch 1055 is interlocking with the switch 1004 and is turned OFF in the intra-frame encoding and ON in the inter-frame encoding. Thus, in the inter-frame encoding, the motion compensated reference block data is supplied to the subtractor 1011 and a prediction error is obtained.

Immediately after an encoded block is first designated to be a special playback block, the switch 1055 is in the OFF state. In this case, even when the switch 1004 has selected the terminal b, the block data from the blocking circuit 1002 is supplied directly to the DCT circuit 1006 and the intra-frame encoding is carried out. After the next frame, the switch 1055 is turned ON and the motion compensated reference block data is supplied to the subtractor 1011. The reference block data has been blocked based on the motion vector obtained from the 2m×2n exclusion range including a special playback block as in the embodiment shown in FIG. 21.

Other operations and effect are the same as the embodiment shown in FIG. 21.

Further, if the switch 1055 is so set that it is turned OFF whenever an encoded block is a special playback block, a special playback block is always intra-frame encoded. In this case, a mosaic display is effectively obtained when, for instance, the quantization range of the output of the DCT circuit 1006 is made extremely wide.

Figure 26:
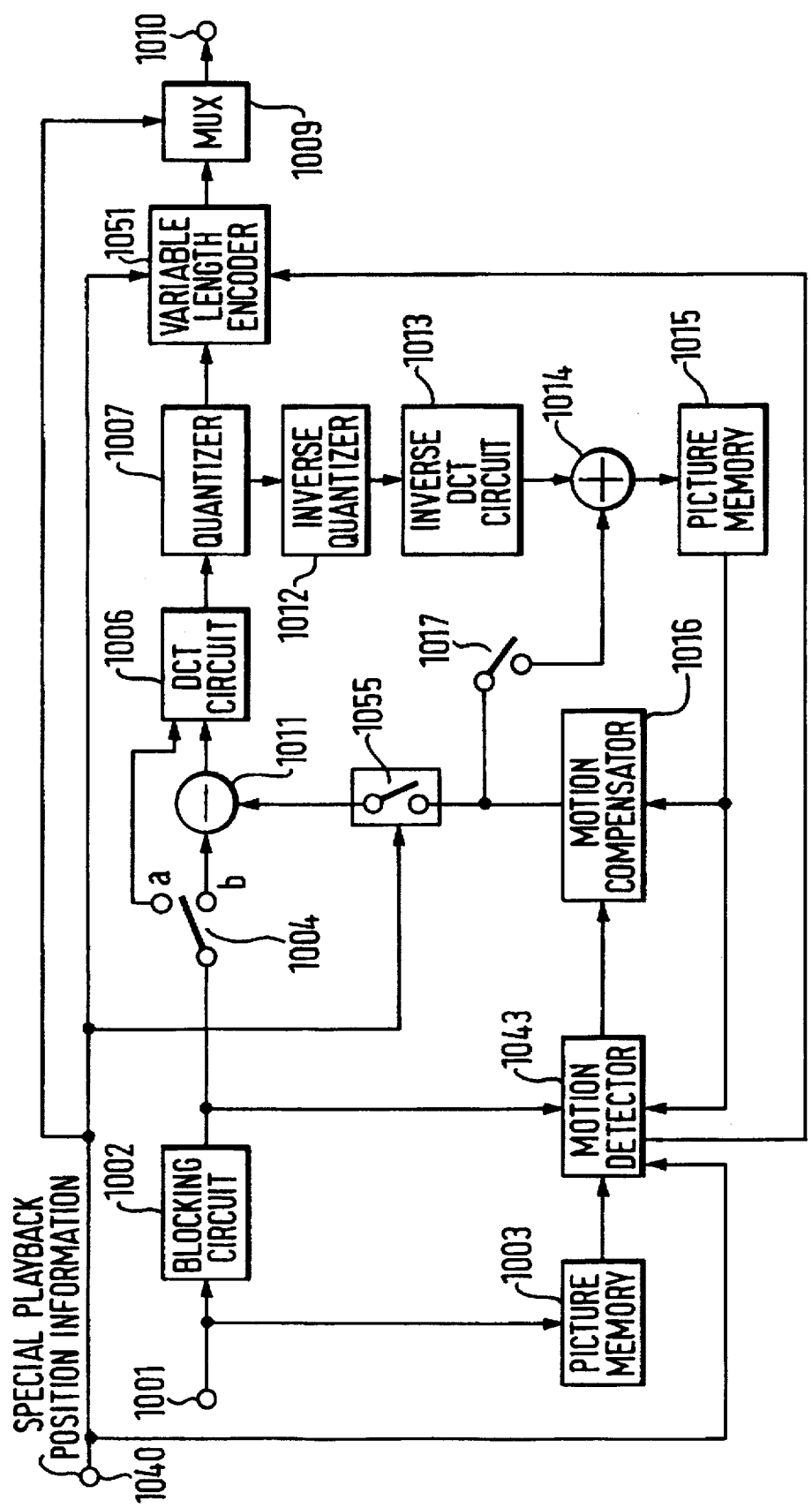
FIG. 26 is a block diagram showing another embodiment of the present invention.

FIG. 26 is a block diagram showing one of the other embodiments of the present invention. In FIG. 26, the same reference numerals are used to designated the same component elements as in FIGS. 23 and 25, and the explanation for these elements is omitted.

This embodiment differs from the embodiment shown in FIG. 25 in that the special playback quantization range decision circuit 1042 and the switch 1041 were eliminated and the variable length encoder 1051 has been adopted for the variable length encoder 1008. Like the embodiment in FIG. 23, the quantizer 1007 carries out the quantization for both normal playback blocks and special playback blocks using the quantization range based on the amount of generated codes, amount of assigned set codes, etc. The variable length encoder 1051 encodes the quantized output from the quantizer 1007 and the motion vector from the motion detector 1043 in variable length and outputs them to the MUX 1009. Further, the variable length encoder 1051 encodes only quantized outputs of the horizontal and vertical low frequency sides in variable length and outputs them.

In the embodiment in the construction as described above, the switch 1055 is turned OFF in the intra-frame encoding and ON in the inter-frame encoding. Further, the switch 1055 is controlled by the information on special playback locations from the terminal 1040 and is turned OFF in the encoding immediately after an encoded block is a special playback block and the block is first designated to be a special playback block. Thus, like the embodiments in FIGS. 23 and 25, the effective mosaic display can be obtained even in the inter-frame encoding mode.

Further, the switch 1055 may be set so that it is turned OFF when it is indicated that an encoded block is a special playback block. In this case, the intra-frame encoding is carried out for a special playback block and therefore, it is possible to display a special playback block in mosaic effectively.

Figure 7:
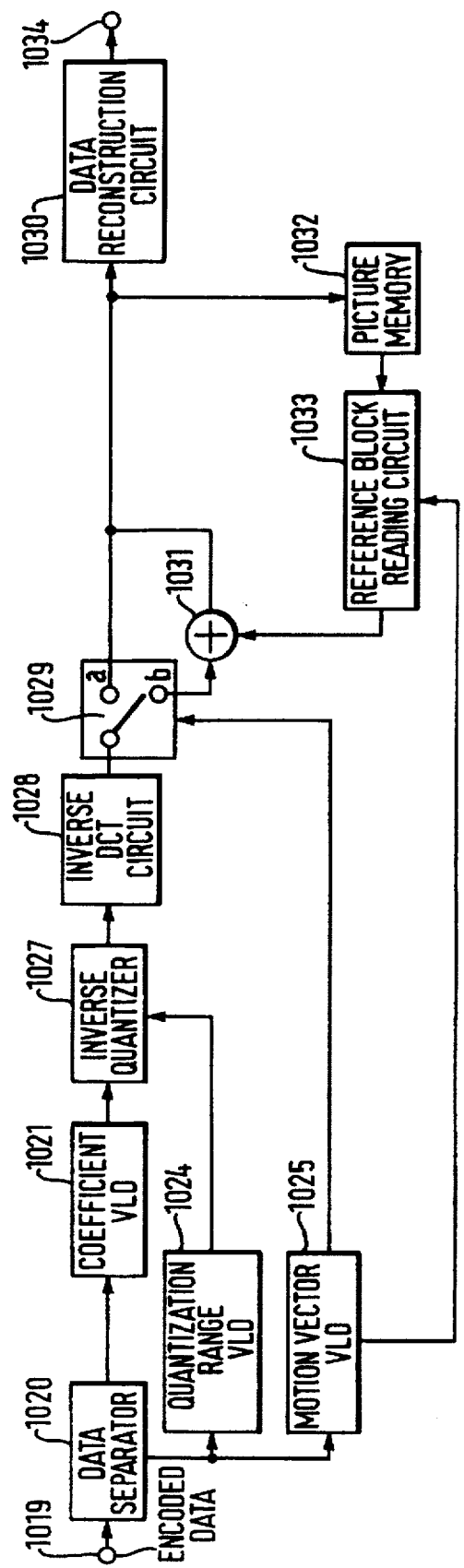
FIG. 7 is a block diagram showing a conventional video data decoding apparatus.
Figure 27:
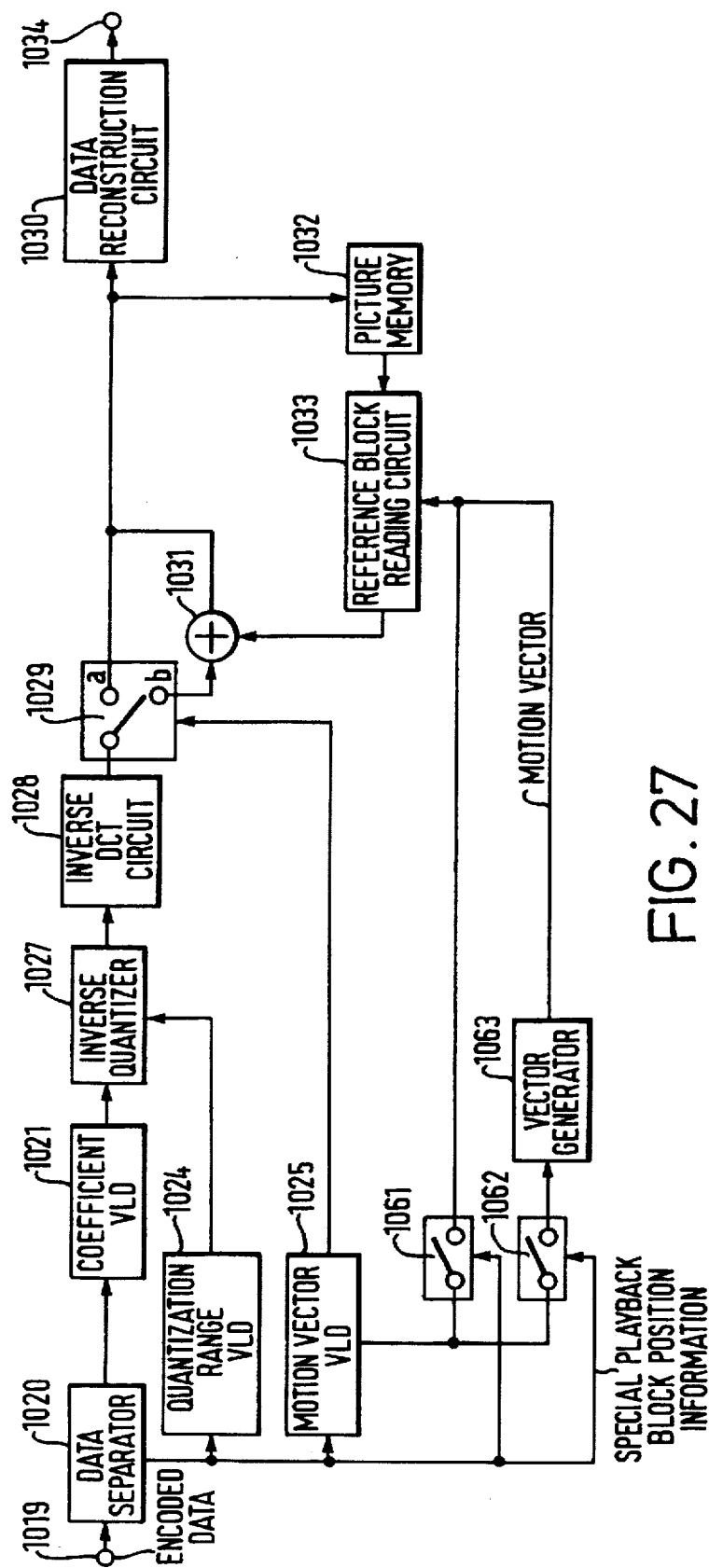
FIG. 27 is a block diagram showing one embodiment of the video data decoding apparatus of the present invention.

FIG. 27 is a block diagram showing one embodiment of a video data motion picture decoding apparatus of the present invention. In FIG. 21, the same reference numerals are used to designate the same component elements as in FIG. 7.

Encoded data of a m×n pixel block with the DCT process applied, quantized and encoded in variable length are input to the input terminal 1019. This encoded are the data intra-frame encoded data, the inter-frame encoded data, encoded data of the motion vector used for the motion compensation, encoded data of the quantization range used for the quantization, and special playback block location information indicating locations of special playback blocks and the data are are multiplexed in the inter-frame encoding. Further, encoded data may be those applied with the DST (Digital Sine Transformation) process, FFT (Fast Fourier Transformation) process, WHT (Fast Walsh-Hadamard) process, FH (Fast Haar) transformation process, FS (Fast Slant) transformation process or KLT (Fast Karhunen-Loeve) transformation process, etc.

This encoded data is input to the data separator 1020 after a header of each layer is extracted by a decoding processor (not shown). The data separator 1020 sequentially reads the input bit stream and by separating DCT coefficient encoded data (coefficient encoded data), quantization range encoded data and motion vector encoded data, outputs them to the coefficient VLD (the variable length decoder) 1021, the quantization range VLD 1024 and the motion vector VLD 1025, respectively. The coefficient VLD 1021 decodes encoded coefficient data in variable length, restores it to the data before the variable length encoding at the encoding side, and outputs the decoded data to the inverse quantizer 1027.

The quantization range VLD 1024 decodes the quantization range encoded data from the data separator 1020 and outputs the quantization range data to the inverse quantizer 1027. The inverse quantizer 1027 carries out the inverse quantization using the quantization range data from the quantization range VLD 1024. As a result, data before the quantization at the encoding side is played back. The inverse DCT circuit 1028 restores the inversely quantized output to the pixel data before the DCT process at the encoding side by carrying out the inverse DCT process and outputs the restored pixel data to the switch 1029. Further, if a transformation other than the DCT process is carried out at the encoding side, an inverse transformation circuit corresponding to this transformation is adopted.

The motion vector VLD 1025 decodes the motion vector encoded data from the data separator 1020 in variable length and outputs the motion vector to the switches 1061 and 1062 and outputs a signal indicating whether an block is the intra-frame encoded or prediction encoded block to the switch 1029. The switch 1029 selects the terminal a when the intra-frame block is indicated by the motion vector VLD 1025 and the terminal b when the prediction encoded block is indicated.

The block data from the terminal a of the switch 1029 is applied to the data reconstruction circuit 1030. The data reconstruction circuit 1030 reconstructs the input block data based on the block address and outputs to the output terminal 1034. Further, the block data from the terminal b of the switch 1029 is applied to the adder 1031. The adder 1031 plays back the current frame block data by adding the output of the reference block readout circuit 1033 (described later) with the block data from the switch 1029 and outputs the played back block data to the data reconstruction circuit 1030 and the picture memory 1032.

The picture memory 1032 stores the output of the adder 1031 for a period of one frame. The reference block readout circuit 1033 reads the preceding picture stored in the picture memory 1032. In this case, the reference block readout circuit 1033 blocks the data at the blocking location based on the motion vector and reads the data, and outputs the read data to the adder 1031 as the motion compensated reference block data. The adder 1031 plays back the current frame block data by adding the decoded output of the current frame with the reference block data and outputs the played back block data.

In this embodiment, a motion vector to be applied to the reference block readout circuit 1033 is switched by the switches 1061 and 1062. That is, the switches 1061 and 1062 operate interlockingly with each other. The switch 1061 is turned ON when decoding normal playback blocks and is turned OFF when decoding special playback blocks. In contrary, the switch 1062 is turned OFF when decoding normal playback blocks and is turned ON when decoding special playback blocks.

When the switch 1061 is turned ON, a motion vector from the motion vector VLD 1025 is supplied to the reference block readout circuit 1033. A vector generator 1063 is actuated when the switch 1062 is turned ON and outputs a prescribed motion vector to the reference block readout circuit 1033.

Next, the operation of the embodiment in the construction as described above is explained.

The coefficient encoded data separated by the data separator 1020 is applied to and decoded by the coefficient VLD 1021 and processed inversely quantized and inverse DCT processed by the inverse quantizer 1027 and the inverse DCT circuit 1028. In this case, the inverse quantizer 1027 inverse quantizes the data using the quantization range data decoded in variable length by the quantization range VLD 1024. When the input block is an intra-frame encoded block, the output of the inverse DCT circuit 1028 becomes block data. The output of the inverse DCT circuit 1028 is applied to the data reconstruction circuit 1030 through the terminal a of the switch 1029. The data reconstruction circuit 1030 reconstructs and outputs the block data based on the block address.

On the other hand, when the input block is a prediction encoded block, the output of the inverse DCT circuit 1028 becomes differential data. The output of the inverse DCT circuit 1028 is applied to the adder 1031 through the terminal b of the switch 1029 end the output of the adder 1031 is applied to the picture memory 1032. The output of the adder 1031 is delayed by, for instance, a period of one frame by the picture memory 1032 and read by the reference block readout circuit 1033. The reference block data up to the preceding frame is output to the adder 1031 from the reference block readout circuit 1033, and the adder 1031 reproduces the current frame data by adding the differential data from the inverse DCT circuit 1028 with the reference block data up to the preceding frame. This played back block data is supplied to the picture memory 1032 and read out as a reference picture at the next frame decoding.

The reference block readout circuit 1033 decides a read location from the picture memory 1032, that is, a blocking position based on a motion vector. Now, when it is assumed that a decoding block is a normal playback block, the switch 1062 is OFF and the switch 1061 is ON. Thus, the motion vector obtained by the motion vector VLD 1025 by decoding the motion vector encoded data containing in the encoded data is supplied to the reference block readout circuit 1033. Using this motion vector, it is possible to block the reference block data at the same blocking location as the blocking location in the motion compensator at the encoding side. As a result, it becomes possible to positively reproduce the current frame block data from the adder 1031.

On the other hand, when a decoded block is a special playback block, the switch 1061 is turned OFF and the switch 1062 is turned ON. Then, the vector generator 1063 operates and a prescribed vector is supplied to the reference block readout circuit 1033 as a motion vector. The reference block readout circuit 1033 decides a blocking location of a reference picture using this motion vector. Therefore, the reference block data which is the same as the motion compensated reference block data at the time of encoding is not output from the reference block readout circuit 1033 and the output of the adder 1031 does not represent the positively reproduced current frame block data. That is, the display of this decoded block becomes a special playback display that is discontinuous to an adjacent normal playback block.

As described above, in this embodiment a blocking location of reference block data is decided using a prescribed vector as a motion vector without using a transmitted motion vector when decoding a special playback block, and it is possible to conduct a special playback display operation on a special playback block effectively.

Figure 28:
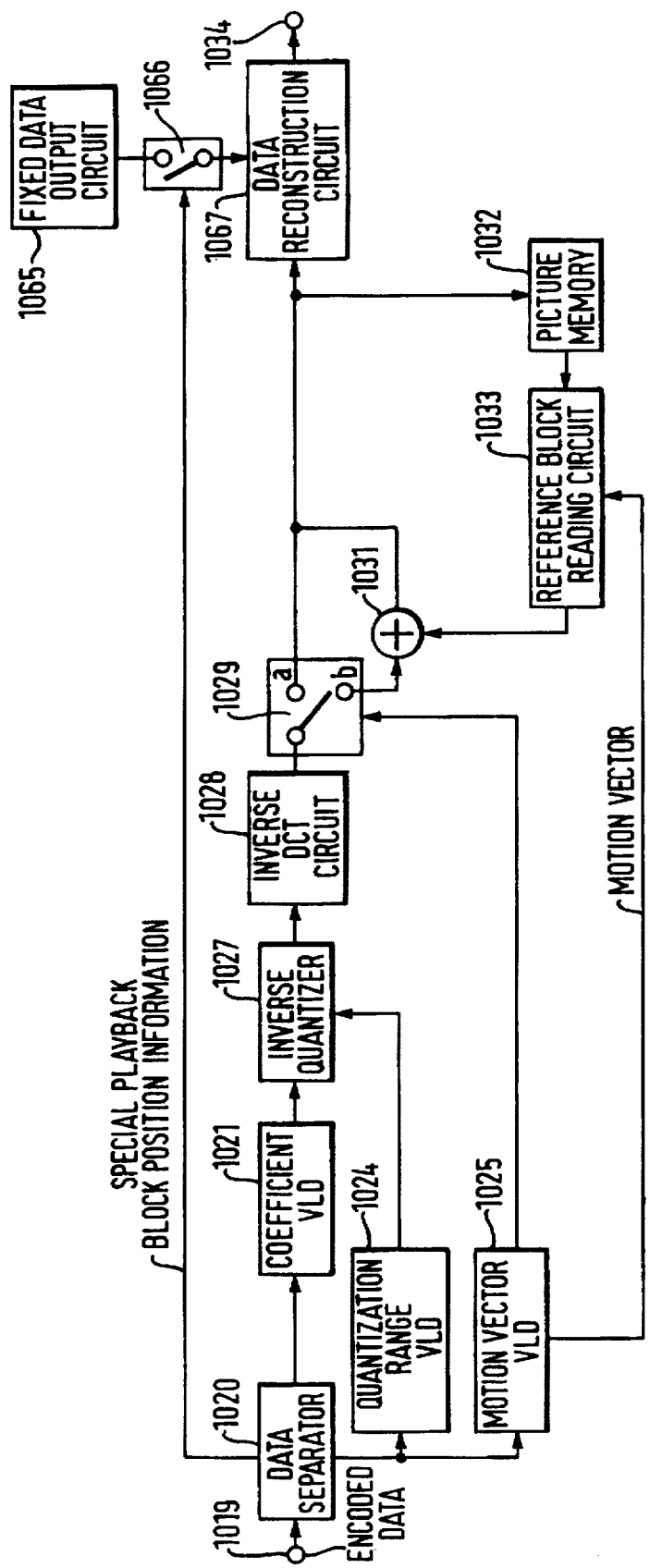
FIG. 28 is a block diagram showing another embodiment of the present invention.

FIG. 28 is a block diagram showing another embodiment of the present invention. In FIG. 28, the same reference numerals are used to designate the same component elements as in FIG. 27 and the explanation of these elements is omitted.

This embodiment differs from the embodiment shown in FIG. 27 in that the switches 1061, 1062 and the vector generator 1063 are omitted, a fixed data output circuit 1065 and a switch 1066 have been added and a data reconstruction circuit 1067 has been adopted for the data reconstruction circuit 1030. The motion vector VLD 1025 decodes the encoded data of the motion vector separated by the data separator 1020 and outputs the motion vector to the reference block readout circuit 1033.

The fixed data output circuit 1065 is able to output a fixed data, for instance, data for displaying a prescribed skin color. The switch 1066 is applied with the information on a special playback block location and is turned ON when it is indicated that a decoded block is a special playback block, outputting a fixed data of the fixed data output circuit 10065 to the data reconstruction circuit 1067. When a decoded block is a special playback block, the data reconstruction circuit 1067 reconstructs the data using block data from the terminal a of the switch 1029 or the adder 1031 and, when a decoded block is a special playback block, reconstructs the data using a fixed data from the switch 1066 and outputs to the output terminal 1034.

Next, the operation of the embodiment in the construction as described above is explained.

The decoded output of the intra-frame encoded block data is obtained through the terminal a of the switch 1029 and the decoded output of the inter-frame encoded block data is obtained from the adder 1031. These decoded block data are applied to the data reconstruction circuit 1067. In this embodiment, the switch 1066 is turned ON at the special playback block timing and fixed data from the fixed data output circuit 10065 is input to the data reconstruction circuit 1067. When the block data from the terminal a of the switch 1029 or the adder 1031 is the decoded output of a special playback block, the data reconstruction circuit 1067 reconstructs block data using the fixed data from the switch 1066 instead of this block data.

As a result, the special playback block is displayed in, for instance, one skin color and such a special playback display as a mosaic display, etc. becomes possible. Other operations and effect are the same as the embodiment shown in FIG. 27.

Figure 29:
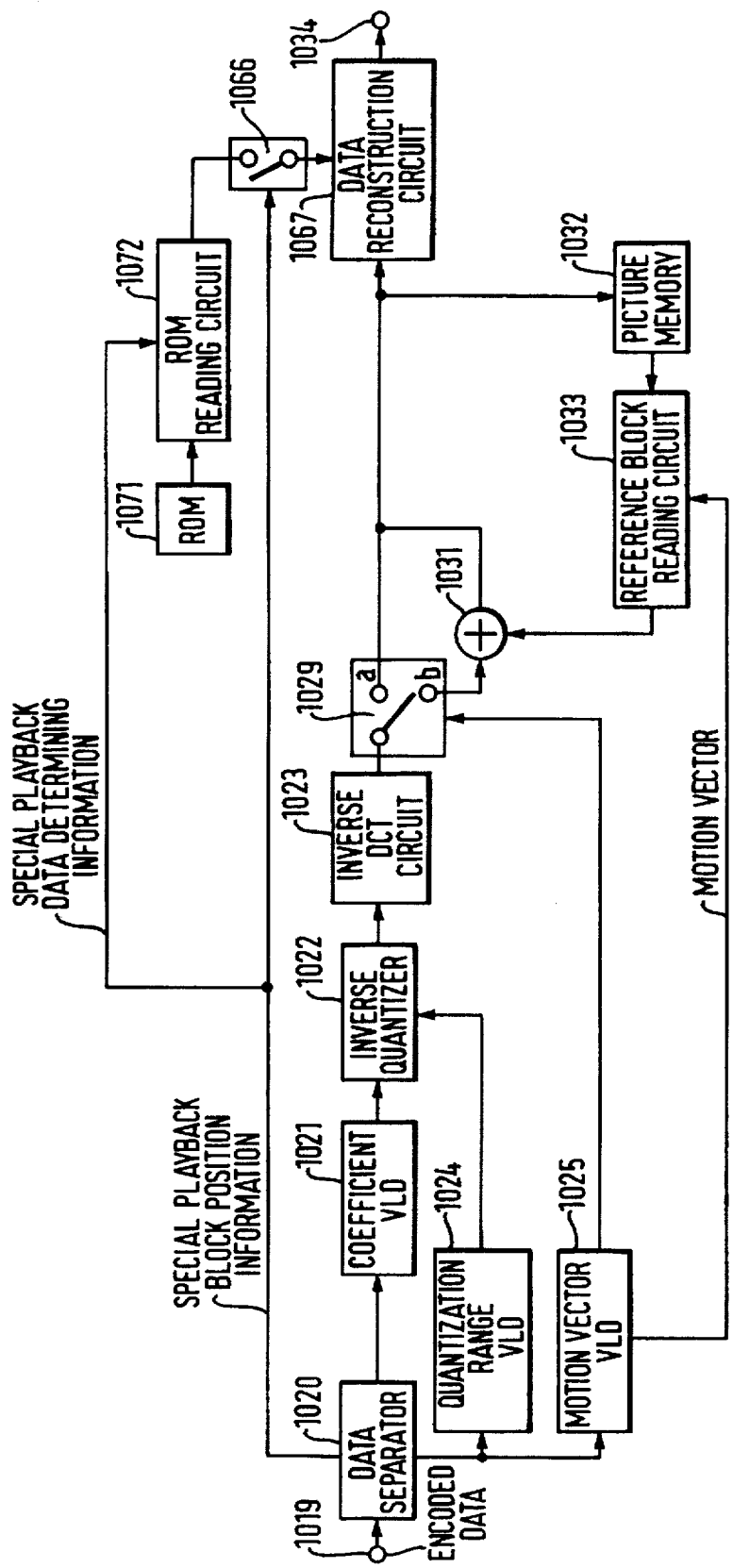
FIG. 29 is a block diagram showing another embodiment of the present invention.

FIG. 29 is a block diagram showing another embodiment of the present invention. In FIG. 29, the same reference numerals are used to designate the same component elements as in FIG. 28.

This embodiment differs from the embodiment in FIG. 28 in that a ROM 1071 and ROM readout circuit 1072 have been provided for the fixed data output circuit 1065. The ROM 1071 stores prescribed RGB data. For instance, the RGB data stored in the ROM 1071 is the same data as RGB-txt data in the X-Window Version 1011. Revision 5. Specific information on special playback data contained in the information on special playback block location is applied to the ROM readout circuit. The specific information on special playback data indicates which data is to be used to replace the decoded output of the special playback block. The ROM readout circuit 1072 reads prescribed fixed data stored in the ROM 1071 by designating an address of ROM 1071 according to the special playback data specific information and outputs the readout data to the data reconstruction circuit 1067 through the switch 1066.

In the embodiment in the construction as described above, special playback data specific information is contained in the special playback block location information indicating a special playback block. It is assumed that, for instance, data indicating black (R, G, B)=(0, 0, 0) is stored in Address 1 of the ROM 1071, and the specific information on the special playback data applied to the ROM readout circuit 1072 when decoding a special playback block having a location on the picture frame (x1, y1) is 1. Then, the ROM readout circuit 1072 reads the data indicating the black color stored in the ROM 1071 when decoding this special playback block and outputs it to the data reconstruction circuit 1067 through the switch 1066. The data reconstruction circuit 1067 reconstructs the block data using the fixed data (0, 0, 0) from the switch 1066 instead of using the decoded output of the block data at the location (x1, y1).

Other operations are the same as the embodiment shown in FIG. 28.

In this embodiment, it is also possible to obtain the same effect as the embodiment in FIG. 28. Further, this embodiment has the advantage that plural kinds of fixed data can be stored in the ROM 1071 and more varicolored special playback display operation than the embodiment in FIG. 28 can be made possible.

Figure 30:
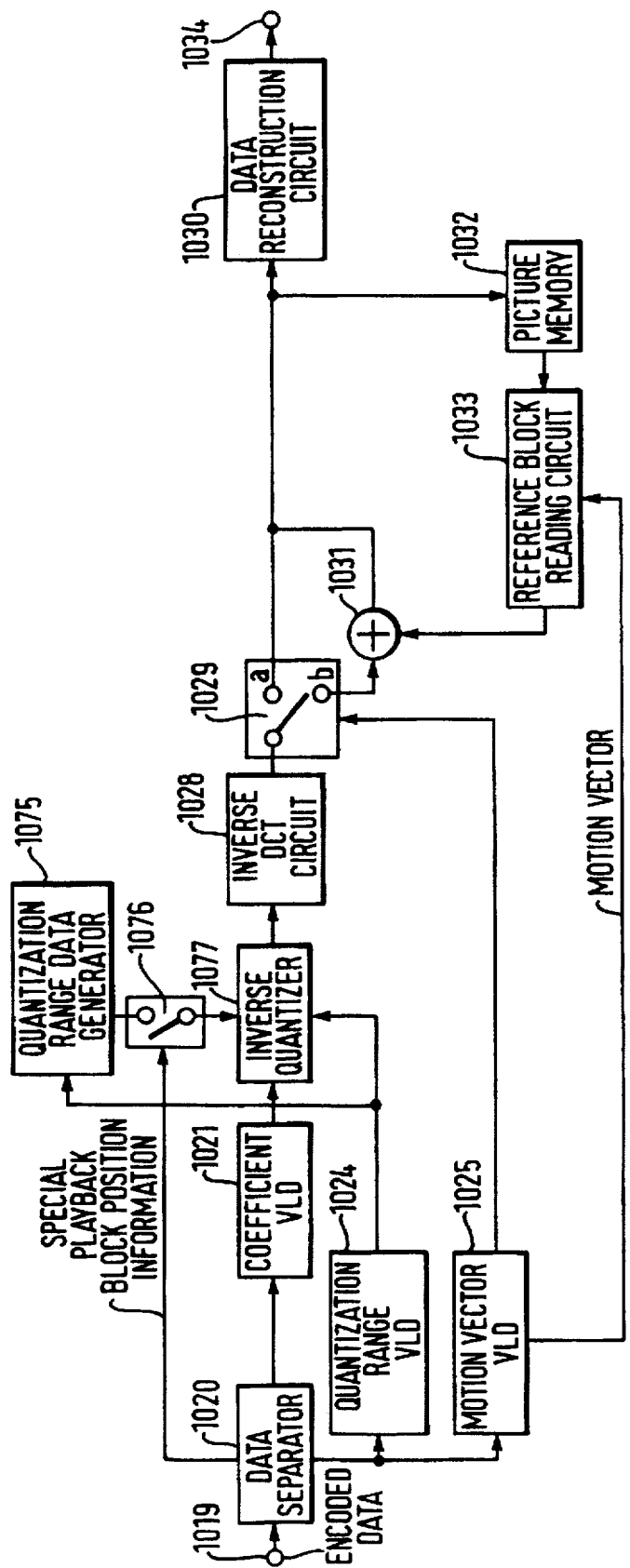
FIG. 30 is a block diagram showing another embodiment of the present invention.

FIG. 30 is a block diagram showing another embodiment of the present invention. In FIG. 30, the same reference numerals are used to designate the same component elements as in FIG. 27 and the explanation of those elements is omitted.

This embodiment differs from the embodiment in FIG. 27 in that the switches 1061, 1062 and the vector generator 1063 shown in FIG. 27 are eliminated, a quantization range data generator 1075 and a switch 1076 have been added, and an inverse quantizer 1077 has been provided for the inverse quantizer 1027. The motion vector VLD 1025 decodes the motion vector encoded data separated by the data separator 1020 and outputs a motion vector to the reference block readout circuit 1033.

The quantization range data generator 1075 generates a quantization range for special playback and outputs it to the switch 1076. The switch 1076 is applied with the information on special playback block location from the data separator 1020, and is turned ON if a decoded block is a special playback block and outputs the special playback quantization range data from the quantization range data generator 1075 to the inverse quantizer 1077. The inverse quantizer 1077 carries out the inverse quantization using a quantization range data from the quantization range VLD 1024 if a decoded block is a normal playback block and carries out the inverse quantization using a special playback quantization range data from the switch 1076 if the decoded block is a special playback block.

In the embodiment in the construction as described above, the switch 1076 is in the OFF state when a decoded block is a normal playback block and the special playback quantization range data is not applied to the inverse quantizer 1077. In this case, the inverse quantizer 1077 carries out the inverse quantization using a quantization range data applied from the quantization range VLD 1024.

On the other hand, if a decoded block is a special playback block, the switch is turned ON and a quantization range data for special playback is applied to the inverse quantizer 1077 through the switch 1076. In this case, the inverse quantizer 1077 carries out the inverse quantization using a quantization range for special playback. For instance, if a quantization range for special playback is zero (0) at the high frequency range side, the power of the high frequency range component of a special playback block becomes extremely small. Therefore, a picture that is reproduced using the block data obtained through the inverse DCT process of this inversely quantized output become a rough picture. Thus, the mosaic display of a special playback block is effectively carried out.

Other operations and effect are the same as the embodiment shown in FIG. 28.

Further, in the embodiments shown in FIGS. 27 through 30, it has been assumed that information on special playback block locations is contained in input encoded data. However, even when the information is not contained in encoded data, it is apparent that the same effect can be obtained by making it possible to designate a special playback block according to, for instance, user operation.

As described above, the present invention makes it possible to select the special display or the normal display of a part of or the entirety of a picture.

The present invention also makes it possible to select the special display or the normal display of a part of or the entirety of a picture even when the motion compensating prediction encoding is adopted, and effective special playback can be made possible.

As described above, the present invention can provide an extremely preferable video data arranging method and video data encoding/decoding apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a divisional application.

What is claimed is:

1. An encoding apparatus comprising:

means for blocking picture data into prescribed block data;

normal encoding means for generating the normal playback block codes for normal playback by encoding the prescribed block data;

special encoding means for generating special playback block codes for special playback by encoding the prescribed block data, the special playback block codes causing a special playback display to be obscured during special playback, said normal encoding means and special encoding means together having:

orthogonal transforming means for outputting transformation coefficients by orthogonally transforming the block data; and quantizing means for quantizing the transformation coefficient in a prescribed quantization range and outputting the quantized output, wherein the special encoding means generates the special playback block code by using the quantized output corresponding to a part of the transformation coefficients from the orthogonal transforming means to create the obscured special playback display;

selection means for applying the prescribed block data only to the normal encoding means when the prescribed block data is to be used for a normal playback display and for applying the prescribed block data to both the normal encoding means and the special encoding means when the prescribed block data is to be used for the special playback display;

location information encoding means for encoding location information for specifying locations of the prescribed block data to be used for the special playback display; and data reconstructing means for arranging the output from the normal encoding means, the special encoding means and the location information encoding means in a prescribed syntax by making them correspond with locations on a picture frame based on the location information.

2. An encoding apparatus comprising:

means for blocking picture data into prescribed block data;

normal encoding means for generating the normal playback block codes for normal playback by encoding the prescribed block data;

special encoding means for generating special playback block codes for special playback by encoding the prescribed block data, the special playback block codes causing a special playback display to be obscured during special playback, said normal encoding means and special encoding means together having:

orthogonal transforming means for outputting transformation display coefficients by orthogonally transforming the block data; and quantizing means for quantizing the transformation coefficients in a prescribed quantization range and outputting the quantized output, wherein the special encoding means outputs the special playback block code by adding a first quantization range data different from a second quantization range data in the quantizing means to create the obscured special playback display;

selection means for applying the prescribed block data only to the normal encoding means when the prescribed block data is to be used for a normal playback display and for applying the prescribed block data to both the normal encoding means and the special encoding means when the prescribed block data is to be used for the special playback display;

location information encoding means for encoding location information for specifying locations of the prescribed block data to be used for the special playback display; and data reconstructing means for arranging the output from the normal encoding means, the special encoding means and the location information encoding means in a prescribed syntax by making them correspond with locations on a picture frame based on the location information.

3. An encoding apparatus comprising:

means for blocking picture data into prescribed block data;

normal encoding means for generating the normal playback block codes for normal playback by encoding the prescribed block data;

special encoding means for generating special playback block codes for special playback by encoding the prescribed block data, the special playback block codes causing a special playback display to be obscured during special playback, said normal encoding means and special encoding means comprising:

orthogonal transforming means for outputting transformation coefficients by orthogonally transforming the block data; and quantizing means for quantizing the transformation coefficients in a prescribed quantization range and outputting the quantized output, wherein the special encoding means encodes only a part of the quantized output corresponding to a block data to create the obscured special playback display;

selection means for applying the prescribed block data only to the normal encoding means when the prescribed block data is to be used for a normal playback display and for applying the prescribed block data to both the normal encoding means and the special encoding means when the prescribed block data is to be used for the special playback display;

location information encoding means for encoding location information for specifying locations of the prescribed block data to be used for the special playback display; and data reconstructing means for arranging the output from the normal encoding means, the special encoding means and the location information encoding means in a prescribed syntax by making them correspond with locations on a picture frame based on the location information.

4. A video data encoding apparatus comprising:

intra-frame encoding means for encoding input picture data for each block in the intra-frame encoding mode;

motion detecting means for detecting the motion between a current frame picture and a prescribed reference picture and for outputting a motion vector based on the detected motion;

motion compensating means for compensating the motion of the prescribed reference picture using the motion vector and for outputting a motion compensated reference picture;

inter-frame encoding means for obtaining a prediction error between the current frame picture and the motion compensated reference picture when the input picture data is applied and for encoding the prediction error for each block in the motion compensating prediction encoding mode;

control means for controlling the intra-frame encoding means to output normal playback encoded output for normal playback blocks and to output special playback encoded output for special playback blocks; and special playback control means in which the prediction error obtained when encoding special playback blocks is larger than the prediction error obtained when encoding normal playback blocks to create an obscured special playback display.

5. A video data encoding apparatus as claimed in claim 4, wherein the intra-frame encoding means and the inter-frame encoding means have an orthogonal transformation encoding means, a quantizing means and a variable length encoding means, and wherein the control means changes a quantization range of the quantizing means to obtain the encoded output for normal playback and the encoded output for special playback.

6. A video data encoding apparatus as claimed in claim 5, wherein the intra-frame encoding means and the inter-frame encoding means have an orthogonal transformation encoding means, a quantizing means and a variable length encoding means, and wherein the control means inhibits transmission of the quantization range data in the high frequency range of the quantizing means to obtain the encoded output for normal playback and the encoded output for special playback.

7. A video data encoding apparatus as claimed in claim 4, wherein the intra-frame encoding means and the inter-frame encoding means have an orthogonal transformation encoding means, a quantizing means and a variable length encoding means, and wherein the control means inhibits transmission of the encoded output in the high frequency range of the variable length encoding means to obtain the encoded output for normal playback and for special playback.

8. A video data encoding apparatus as claimed in claim 4, wherein the special playback control means makes the prediction error large by lowering the motion vector detecting accuracy.

9. A video data encoding apparatus as claimed in claim 8, wherein the motion detecting means has an operating means for calculating a motion vector by executing a matching calculation between picture data in a search range that is set in the prescribed reference picture and the current frame picture data, and wherein a prescribed range including the special playback blocks is excluded from the search range if a special playback block is contained in the search range.

10. A video data encoding apparatus as claimed in claim 4, wherein the special playback control means makes the motion compensated reference picture zero a and adopts the intra-frame encoding mode if the block to be encoded is a special playback block.

11. A video data encoding apparatus as claimed in claim 4, wherein the control means adopts the intra-frame encoding mode immediately after a prescribed block in the picture frame has been designated for a special playback block in a sequence in the encoding process.

12. A video data encoding apparatus as claimed in claim 4, further comprising location information adding means for adding the information on the special playback block to the encoded output.

13. A video data decoding apparatus comprising:

intra-frame decoding means for reproducing picture data by decoding intra-frame encoded data when the encoded data is encoded in the intra-frame encoding mode and the motion compensation prediction encoding mode;

inter-frame decoding means for reproducing picture data by adding a prescribed motion compensation reference picture with a prediction error while obtaining a prediction error by decoding the encoded data and extracting a motion vector contained in the encoded data to compensate for the motion of a prescribed picture; and switching means for generating a motion compensated reference picture using a special playback motion vector in place of the motion vector extracted from the encoded data by controlling the inter-frame decoding means if a block to be decoded is a special playback block for generating an obscured special playback display.

14. A video data decoding apparatus as claimed in claim 13, wherein the switching means detects that a block to be decoded is a special playback block based on the information the special playback block location contained in the encoded data.

15. A video data decoding apparatus comprising:

decoding means having variable length decoding means, inverse quantizing means and inverse orthogonal transforming means, said decoding means reproducing picture data by decoding encoded data using first quantization range information extracted from the encoded data when the encoded data is input; and switching means for decoding block data to use second quantization range information for special playback in place of the first quantization range information extracted from the encoded data by controlling the decoding means when a block to be decoded is a special playback block to create an obscured special playback display.

* * * * *